United States Patent
Bosworth

(10) Patent No.: US 11,507,203 B1
(45) Date of Patent: Nov. 22, 2022

(54) BODY POSE ESTIMATION USING SELF-TRACKED CONTROLLERS

(71) Applicant: Meta Platforms Technologies, LLC, Menlo Park, CA (US)

(72) Inventor: Andrew Garrod Bosworth, San Mateo, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/353,696

(22) Filed: Jun. 21, 2021

(51) Int. Cl.
| | |
|---|---|
| H04S 7/00 | (2006.01) |
| G06F 3/0346 | (2013.01) |
| G06F 3/01 | (2006.01) |
| G06T 7/73 | (2017.01) |
| G06N 3/08 | (2006.01) |
| G06N 3/04 | (2006.01) |

(52) U.S. Cl.
CPC .......... *G06F 3/0346* (2013.01); *G06F 3/012* (2013.01); *G06N 3/049* (2013.01); *G06N 3/08* (2013.01); *G06T 7/73* (2017.01); *G06T 2207/20081* (2013.01); *G06T 2207/20084* (2013.01); *G06T 2207/30196* (2013.01)

(58) Field of Classification Search
CPC ......... G06F 3/012; G06T 19/006; G06T 7/70; G06V 20/20; G06V 40/107; G06V 40/20; G06N 20/00; G06N 5/04
See application file for complete search history.

(56) References Cited

U.S. PATENT DOCUMENTS

| | | | | |
|---|---|---|---|---|
| 2013/0271602 | A1* | 10/2013 | Bentley | G06V 40/25 348/143 |
| 2015/0352437 | A1* | 12/2015 | Koseki | A63F 13/5255 463/31 |
| 2021/0157396 | A1 | 5/2021 | Huang et al. | |

FOREIGN PATENT DOCUMENTS

WO 2017117675 A1 7/2017

OTHER PUBLICATIONS

Ahuja K., et al., "ControllerPose: Inside-Out Body Capture with VR Controller Cameras," Chi Conference on Human Factors in Computing Systems, Apr. 27, 2022, No. 108, pp. 1-13, XP055956505, Retrieved from the Internet: URL: https://dl.acm.org/doi/10.1145/3491102.3502105.

(Continued)

*Primary Examiner* — Insa Sadio
(74) *Attorney, Agent, or Firm* — Baker Botts L.L.P.

(57) ABSTRACT

In one embodiment, a computing system may determine a pose of a controller held by a user based on sensor data captured by the controller. The system may determine positions of a first set of keypoints associated with a first portion of a body of the user based on images captured by the controller cameras and (2) the controller pose. The system may determine a pose of a headset worn by the user based on sensor data captured by the headset. The system may determine positions of a second set of keypoints associated with a second portion of the body of the user based on images captured by the headset cameras and (2) the pose of the headset. The system may determine a full body pose of the user based at least on the positions of the first set and the second set of keypoints.

20 Claims, 14 Drawing Sheets

(56) References Cited

OTHER PUBLICATIONS

Drexler D. A., et al., "Joint Constrained Differential Inverse Kinematics Algorithm for Serial Manipulators," Periodica Polytechnica Electrical Engineering, Jan. 31, 2012, vol. 56, No. 4, pp. 95-104, XP055956765, Retrieved from the Internet: URL: https://www.researchgate.net/publication/274584891_Joint_Constrained_Differential_Inverse_Kinematics_Aigorithm_for_Seriai_Manipulators.
International Search Report and Written Opinion for International Application No. PCT/US2022/031494, dated Sep. 9, 2022, 12 pages.

* cited by examiner

BODY POSE ESTIMATION USING SELF-TRACKED CONTROLLERS

TECHNICAL FIELD

This disclosure generally relates to human-computer interaction technology, in particular to tracking user body pose.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods of using cameras that are integrated with one or more controllers to estimate a user's full body pose, including the body parts that are not visible to head-mounted display (HMD) cameras. In particular embodiments, the controller may be a self-tracking controller having one or more integrated cameras (also referred to as inside-out cameras) and IMUs that are integrated with the controller. A self-tracking controller may use its inside-out cameras and IMUs to perform simultaneous localization and mapping (SLAM) for self-localization. The images captured by the controller cameras may be used for estimating the user's body-pose, in particular, for estimating the body parts (e.g., legs, feet, knees, etc.) that are not visible to HMD cameras. In particular embodiments, the control may not need to be self-tracking. Instead, the controller's position or location in the 3D space may be determined using HMD cameras or sensors.

As an example and not by way of limitation, the system may use HMD cameras to track the user's body parts (e.g., the user's head, shoulders, arms, hands, fingers etc.) that are visible to HMD cameras, to determine a first set of keypoints associated with these visible body parts. At the same time, the controller may use its inside-out cameras to track the user's body parts that are not visible to the HMD cameras, to determine a second set of keypoints associated with these body parts (e.g., lower-body parts, such as knees, etc.) of the user. Each controller camera may capture the images of the user's body parts from its own perspective and these images may be used to determine the corresponding keypoints of these body parts falling with the FOV of that controller camera. The controller may determine the 3D locations of the keypoints related to knees, legs, feet, etc., based on the 3D position of the controller camera, the camera's intrinsic/extrinsic parameters, and the images captured by the camera. Each controller may capture body pose information from a different viewpoint and multiple controllers may collaborate and coordinate with each other to determine a more accurate estimation of the keypoints of the user's body. Each controller by itself may have an incomplete estimation of the user's body pose but multiple controllers may collectively determine an accurate estimation of the keypoints. The system may combine the keypoints determined by the controller cameras (e.g., for the lower-part body) of each controller and the keypoints determined based on the HMD cameras (e.g., for the upper-part body) and feed these keypoints into an inverse-kinematic optimizer to determine an estimation on the full body of the user.

To protect the user's privacy, the images captured by each controller camera may be processed within that controller locally and the controller may only send out the processed information, such as the 3D positions of the keypoints, to the computing unit (e.g., in the headset) tasked to estimate the user's body pose based on the determined keypoints. In some embodiments, the images captured by the controllers and the pose information of the controllers may be sent to the headset for processing but will be strictly kept locally on the headset and will not be sent to any remote computers.

To estimate the user's body pose based on the keypoints, the system may use a muscular-skeletal model to fit all the keypoints to determine the most likely body pose of the user. For example, even if a part of the user's body (e.g., arms) are not fully visible to any camera, the system may use the muscular-skeletal model to estimate the pose of that body part based on the overall fitting results. The muscular-skeletal model may impose some constraints (e.g., the forearms can only bend forward, not backward), and the system may use these constraints on the observed keypoints to estimate the full body pose. All these constraints may be applied on the inverse-kinematic optimizer to figure out the most likely full body pose that is consistent with the constraints. After the user's body pose is determined, the system may check the estimated pose against a number of rules determined based on knowledge related to human body to make sure the estimated pose does not violate the natural constraints of the human body.

In particular embodiments, the system may use ML models to estimate keypoints associated with the user's body parts that are not directly visible to any camera based on the keypoints from previously frames. For example, the system may train a temporal neural network (TNN) with the keypoints of the user body determined based on previous frames (e.g., within a time window sliding over time) to predict the current keypoints of the user body, even some parts of the user body are not currently visible to any camera. After that, the system may feed the estimated keypoints of the user body to the inverse-kinematic optimizer to determine the full body pose of the user (based the muscular-skeletal model constraints).

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
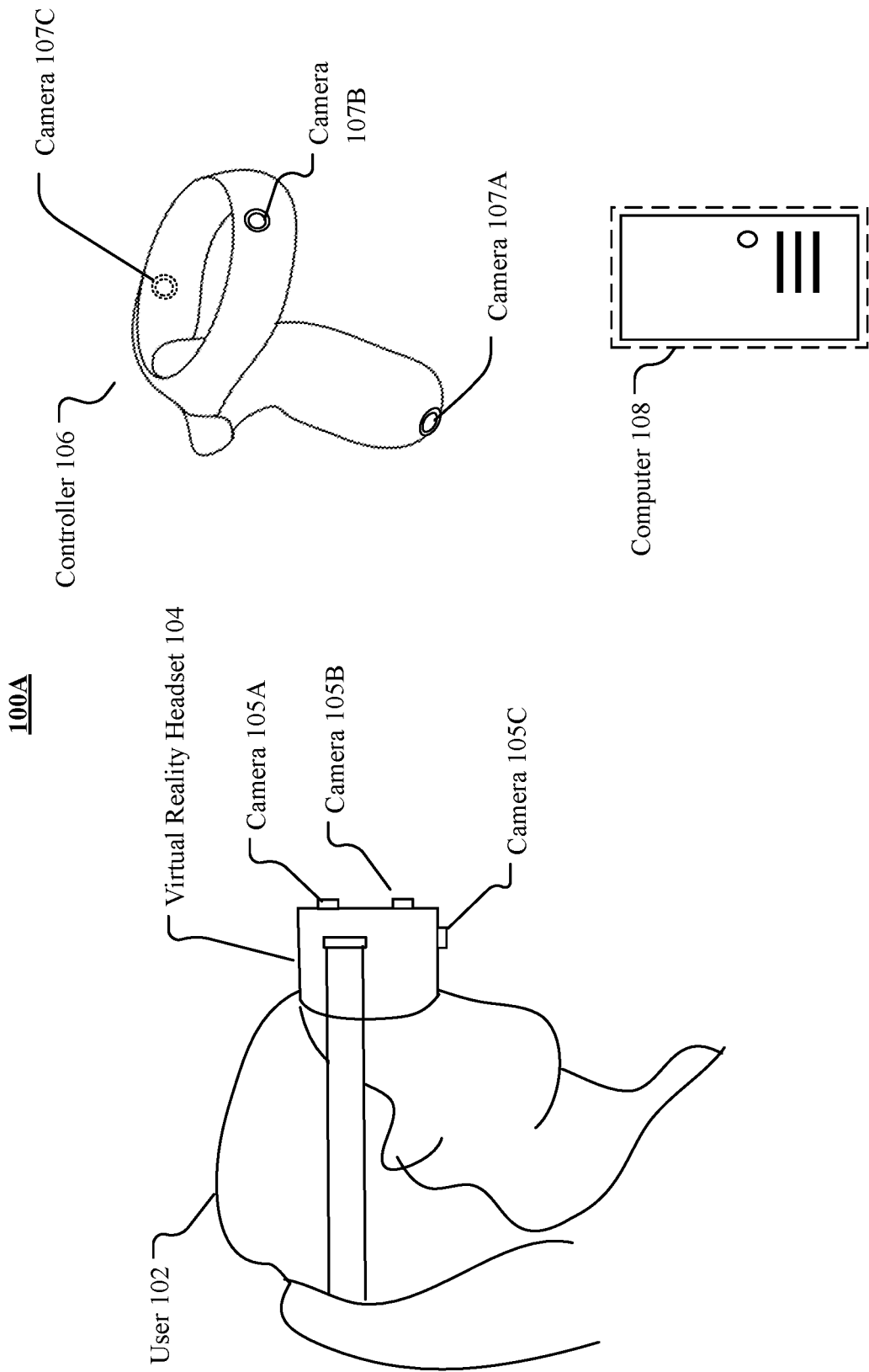
FIG. 1A illustrates an example artificial reality system with a self-tracking controller.

Existing AR/VR systems may estimate the user's body pose based on images captured by HMD cameras. However, this method has some limitations. For example, the cameras on the HMD cannot see the lower part of the user's body (e.g., legs, feet, knees), resulting in the estimated body pose of the user being incomplete. This could negatively affect user experience in situations where users expect to see full body avatars or full body poses of each other.

To solve this problem, particular embodiment of the system may use one or more self-tracking controllers with cameras to capture the images of the body parts that are not visible to HMD cameras to estimate a user's full body pose. The self-tracking controllers may perform simultaneous localization and mapping (SLAM) for self-localization. The images captured by the controller cameras may be used for body-pose estimation, in particular, for determining the pose of the body parts that are not visible to the HMD cameras (e.g., legs, feet, knees, etc.). For example, the controllers may determine the 3D locations of the keypoints related to knees, legs, feet, etc., based on: (1) the 3D position and pose (e.g., facing direction) of the controller camera, (2) the camera's intrinsic/extrinsic parameters (e.g., field of view (FOV)), and (3) the images captured by the camera. Each controller may capture body pose information from a different viewpoint and multiple controllers may collaborate and coordinate with each other to determine a more accurate estimation of the keypoints of the user's body. Each controller by itself may have an incomplete information of the user's body but multiple controllers may collectively determine an accurate estimation of the keypoints. The system may combine the keypoints determined based on the controller camera data (e.g., for the lower-part body) of all controllers and the keypoints determined based on the HMD camera data (e.g., for the upper-part body) and feed these keypoints into an inverse-kinematic optimizer to determine an estimation on the full body of the user.

By using the image data from both HMD cameras and controller cameras, particular embodiments of the system may estimate the full body pose more accurately, even some parts of the user's body are not visible to the HMD cameras or controller cameras. By using multiple controllers collectively, particular embodiments of the system may accurately estimate the full body pose of the user even each controller can only perceive a portion of the user's body, because the multiple controllers may provide more complete information about the user's body pose when working collectively. By restricting the image data to the local system (e.g., processed within the controllers, the headset or the local computer), particular embodiments of the system may provide strong protection for the user's privacy. By providing a full body pose estimation, particular embodiments of the system may provide a better user experience for the users to interact with the artificial reality system and/or with each other (e.g., seeing full body pose of a user avatar).

FIG. 1A illustrates an example virtual reality system 100A with a self-tracking controller 106. In particular embodiments, the virtual reality system 100A may include a head-mounted headset 104, a controller 106, and a computing system 108. A user 102 may wear the head-mounted headset 104, which may display visual artificial reality content to the user 102. The headset 104 may include an audio device that may provide audio artificial reality content to the user 102. In particular embodiments, the headset 104 may include one or more cameras which can capture images and videos of environments. For example, the headset 104 may include front-facing camera 105A and 105B to capture images in front the user the user 102, and may include one or more downward facing cameras (e.g., 105C) to capture the images of the user's body. The headset 104 may include an eye tracking system to determine the vergence distance of the user 102. The headset 104 may be referred as a head-mounted display (HMD). The controller 106 may include a trackpad and one or more buttons. The controller 106 may receive inputs from the user 102 and relay the inputs to the computing system 108. The controller 106 may also provide haptic feedback to the user 102.

In particular embodiments, the controller 106 may be a self-tracking controller. The term "self-tracking" controller may refer to a controller that can determine its own position or location within the 3D space (with respect to the headset or other objects in the environment) using its integrated sensors and/or cameras. A self-tracking controller may include one or more sensors (e.g., IMUs, acceleration sensors, space angle sensor, attitude sensors) and cameras, and the data of these sensors and cameras may be used for performing self-localization. For example, the self-tracking controller 106 may include one or more sensors and cameras, that can be used to track the user's body pose and/or motion, including, for example, but not limited to, RGB cameras, thermal cameras, infrared cameras, radars, LiDARs, structured light sensors, inertial measurement units (IMU), gyroscope sensors, accelerometers, space angle sensors, attitude sensors, etc. In particular embodiments, the self-tracking controller 106 may include one or more cameras (e.g., cameras 107A, 107B, and 107C) to capture the images of the surrounding environment. For example, the controller cameras 107A, 107B, and 107C may be used to track the user's body parts that may or may not be visible to the headset cameras (e.g., 105A, 105B, and 105C) to determine the full body pose of the user 102. The computing system 108 may be connected to the headset 104 and the controller 106 through cables or wireless communication connections. The computing system 108 may control the headset 104 and the controller 106 to provide the artificial reality content to the user 102 and may receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
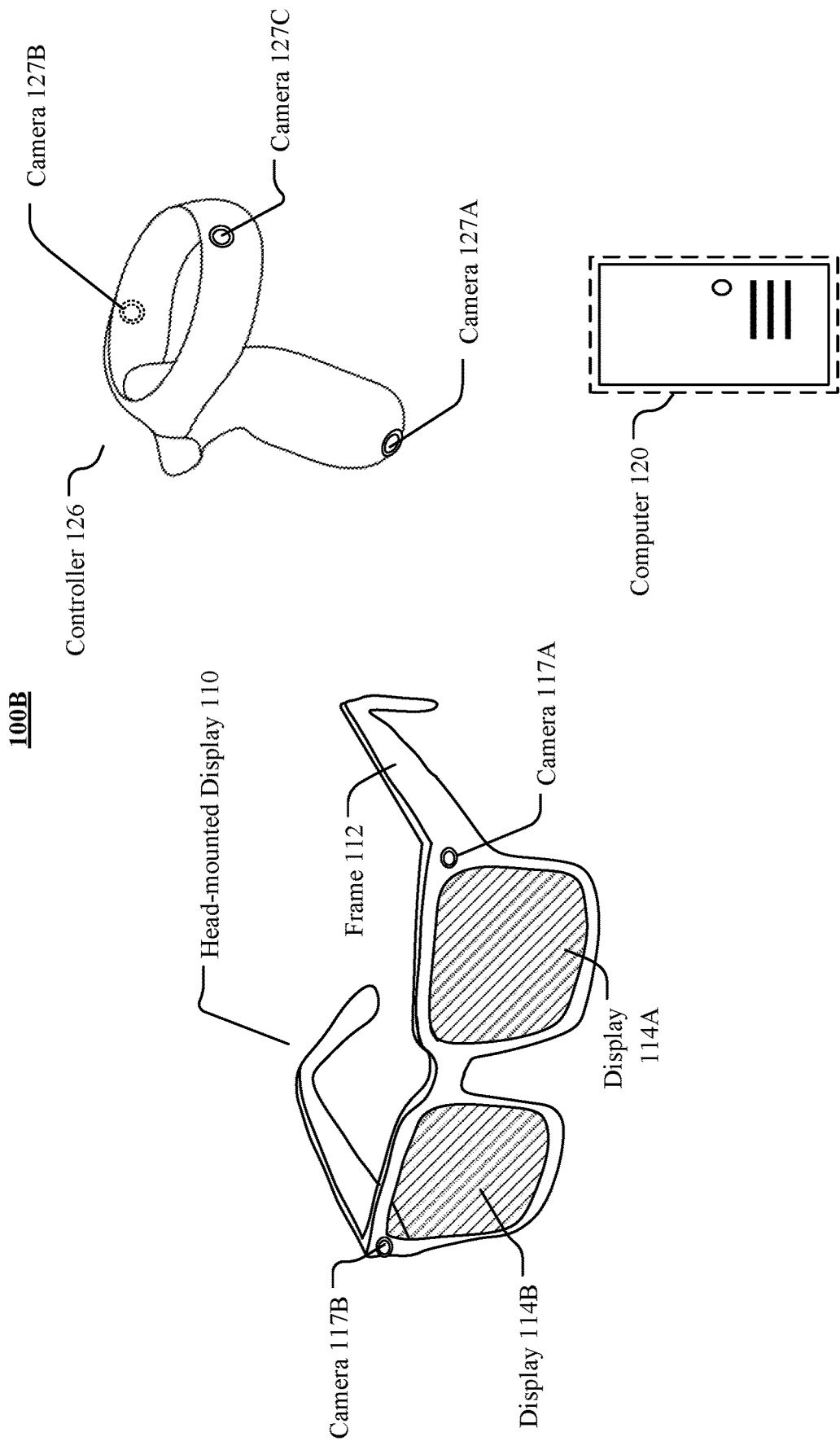
FIG. 1B illustrates an example augmented reality system with a self-tracking controller.

FIG. 1B illustrates an example augmented reality system 100B with a self-tracking controller 126. The augmented reality system 100B may include a head-mounted display (HMD) 110 (e.g., AR glasses) comprising a frame 112, one or more displays 114A and 114B, and a computing system 120, etc. The displays 114 may be transparent or translucent allowing a user wearing the HMD 110 to look through the displays 114A and 114B to see the real world, and at the same time, may display visual artificial reality content to the user. The HMD 110 may include an audio device that may provide audio artificial reality content to users. In particular embodiments, the HMD 110 may include one or more cameras (e.g., 117A and 117B), which can capture images and videos of the surrounding environments. The HMD 110 may include an eye tracking system to track the vergence movement of the user wearing the HMD 110. The augmented reality system 100B may further include a controller 126 having a trackpad and one or more buttons. The controller 126 may receive inputs from the user and relay the inputs to the computing system 120. The controller 126 may provide haptic feedback to the user.

In particular embodiments, the controller 126 may be a self-tracking controller including one or more sensors that can be used to track the user's body pose and/or motion. The sensors may be or include, for example, but not limited to, RGB cameras, thermal cameras, infrared cameras, radars, LiDARs, structured light sensors, inertial measurement units (IMU), gyroscope sensors, accelerometers, space angle sensors, attitude sensors, etc. In particular embodiments, the controller 126 may include one or more cameras (e.g., 127A, 127B, 127C) to capture the images in the surrounding environment. For example, the controller cameras (127A, 127B, 127C) may be used to track the user's body parts that are not visible to the HMD cameras 117A and 117B. The computing system 120 may be connected to the HMD 110 and the controller 126 through cables or wireless connections. The computing system 120 may control the HMD 110 and the controller 126 to provide the augmented reality content to the user and receive inputs from the user. The computing system 120 may be a standalone host computer system, an on-board computer system integrated with the HMD 110, a mobile device, or any other hardware platform capable of providing artificial reality content to and receiving inputs from users.

Figure 2A:
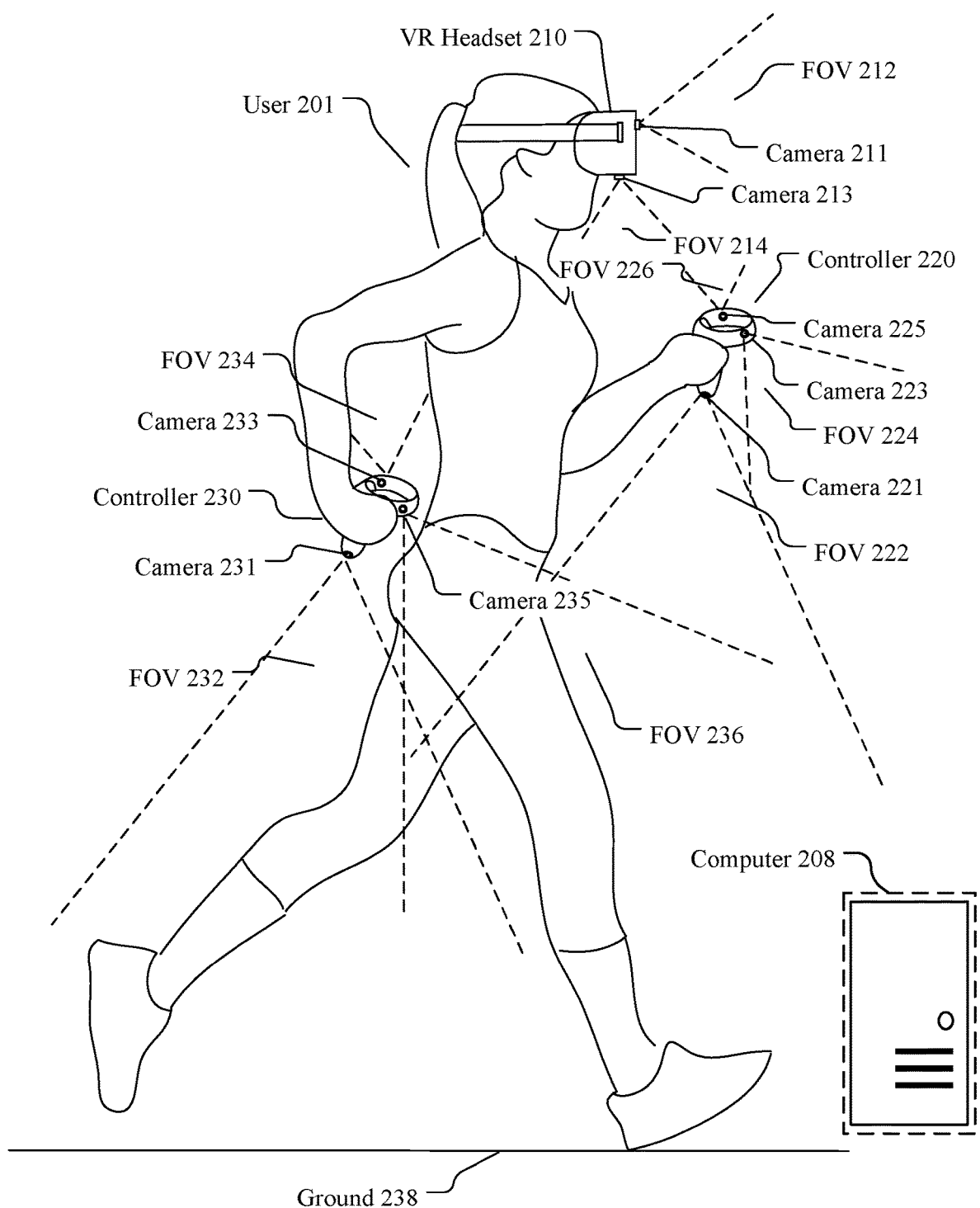
FIG. 2A illustrates an example scheme of using headset sensors and controller sensors to track the user body pose.

FIG. 2A illustrates an example scheme 200A of using headset sensors and controller sensors to track the user body pose. In particular embodiments, the headset 210 may include one or more sensors (e.g., IMUs) and cameras (e.g., 211, 213). The cameras (e.g., 211, 213) may have different fields of view (FOVs). For example, the camera 211 may be front-facing having a FOV of 212 and the camera 213 may be downward-facing having a FOV of 214. The camera 211 may be used to track objects in front of the user 201 in the surrounding environments. The camera 213 may be used to track objects that are close to the user's body and the user's upper body parts (e.g., the user's arm and/or hand in front of the user's body, the user's foot and leg in front of the user's body, the user's upper body, the controller 220, etc.). In particular embodiments, each controller (e.g., 220, 230) may include one or more cameras (e.g., 221, 223, 225) that have different FOVs. Depending on the 3D position and pose (e.g., direction) of the controller, the FOVs of the controller cameras may face different directions and controller cameras may be used to track different body parts of the user. For example, the controller 220 may have the camera 221 at the bottom of the handle portion with the FOV 222 facing downward (with respect to the controller itself). The camera 221 may be used to track the objects that are in front of the user's body and the lower-body parts of the user (e.g., the user's leg and feet in front of the user's body). As another example, the camera 223 having the FOV 224 may be used to track objects in front of the user's lower body part. The camera 225 having the FOV 226 may be used to track objects in front of the user's upper body part. Similarly, the controller 230 may have cameras 231, 233, and 235 with the FOVs of 232, 234, and 236, respectively. Depending on the 3D position and pose of the controller, the FOVs of the cameras may face different directions and the cameras may be used to track different parts of the user's body. For example, the camera 231 may be used to track the user's leg and feet extending backward. The camera 233 may be used to track the upper body parts of the user (e.g., the arm or shoulder) that falls within its FOV 234. The camera 235 may be used to track the user's leg and feet extending in the forward direction. In particular embodiments, the controllers 220 and 230 may its their cameras to capture the images of the user's body parts from different perspective, to track these body parts of the user 201. The images may be processed locally on respective controllers or may be processed on the headset 210 or on the local computer 208 and will be strictly restricted from being transmitted outside the local computing systems.

It is notable that the cameras 221, 223, and 225 for the controller 220 and the cameras 231, 233, and 235 for the controller 230 are for example purposes and the controller cameras are not limited thereof. For example, a controller may any suitable number of cameras installed at any suitable locations on the controller. The controllers may be held by or attached to the user 201 in any suitable manners and with any suitable positions and poses. The controller cameras may have separate FOVS facing different directions depending on the camera orientations and the controller positions. One or more controller cameras of the same or different controllers may have overlapping FOVs, depending on the camera orientations and the controller positions. A controller camera may capture a body part of the user from a particular perspective and different controller cameras of the same controller or different controllers may capture the same body part of the user from different perspectives or may capture different body parts of the user. In particular embodiments, the camera FOVs of a controller of multiple controllers may collectively cover 360 degrees of the surrounding environment.

Figure 2B:
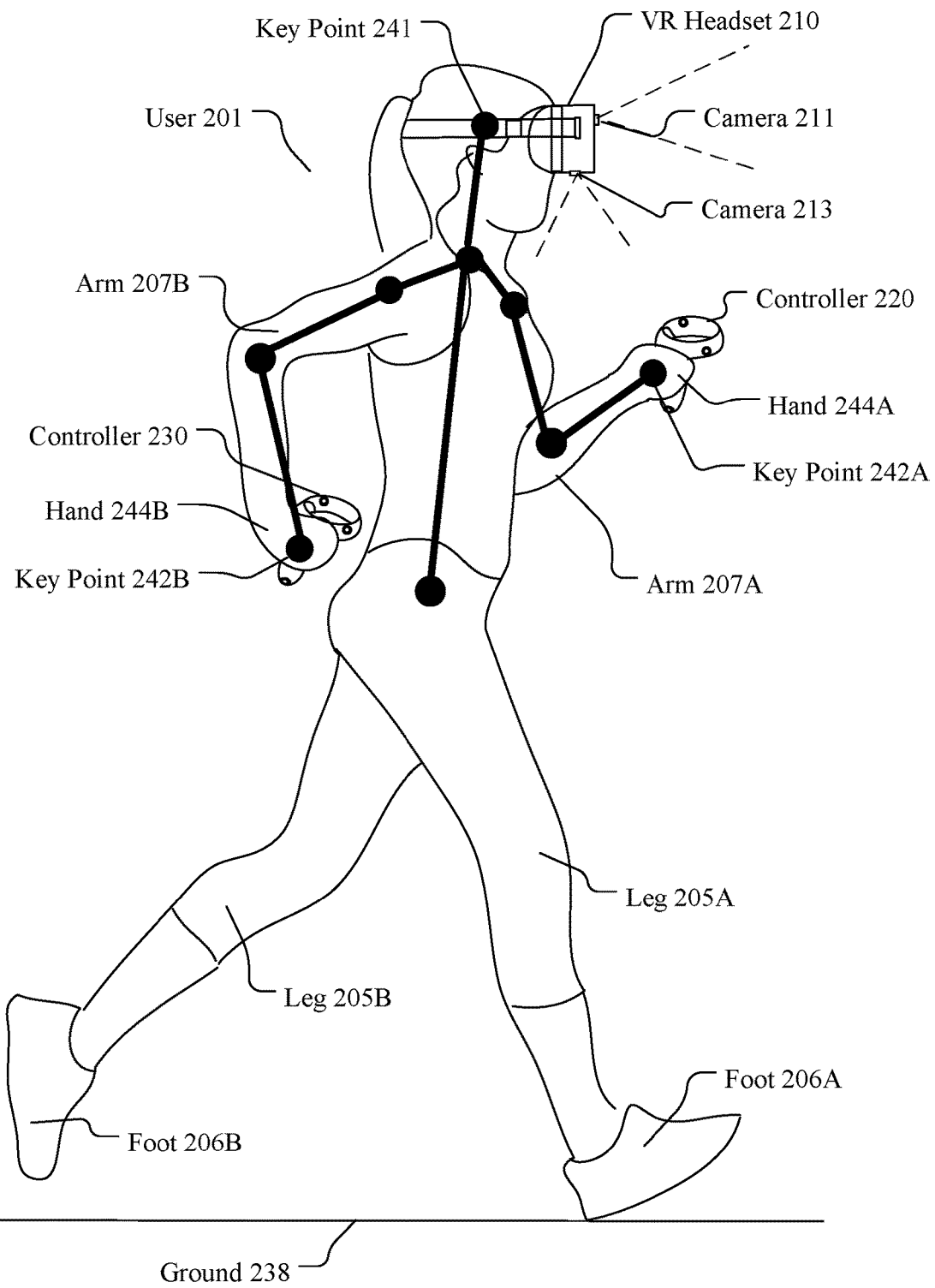
FIG. 2B illustrates an example process of using controller and headset poses to track the user's upper body parts.

FIG. 2B illustrates an example process 200B of using controller and headset pose to track the user's upper body parts. In particular embodiments, the headset 210 may include IMUS and cameras (e.g., 211 and 213) which can be used to perform simultaneous localization and mapping (SLAM) for self-localization. Thus, the headset 210 may be used to accurately determine the head position (e.g., as represented by the key point 241) of the user 201 (taking into consideration of the relative position of the headset 210 and the head of the user 201). In particular embodiments, the controllers 220 and 230 may each include IMU, cameras, and any suitable sensors, which can be used to perform SLAM for self-localization. Thus, the controllers 220 and 230 may accurately determine the user's hand positions (e.g., as represented by the key point 242A and 242B). As a result, the system may accurately determine at least three keypoints 241, 242A, and 242B associated with the user's head and hands. Because human skeletons have inherent structural constraints, the system may use limited keypoints (e.g., 242A, 242B, and 241) to infer the positions of other keypoints (e.g., neck, shoulders, elbows) and estimate the body pose for the upper body of the user 201. For example, because human skeletons only allow particular arm poses for the arm 207B when the user's hand 242B is at the key point 244B, the system may accurately infer the user's arm pose for the right arm 207B based on the single key point 244B. Similarly, because human skeletons only allow particular arm poses for the arm 207A when the user's hand is at the key point 244A, the system may effectively infer the user's arm pose for the left arm 207A based on the single key point 244A.

Figure 2C:
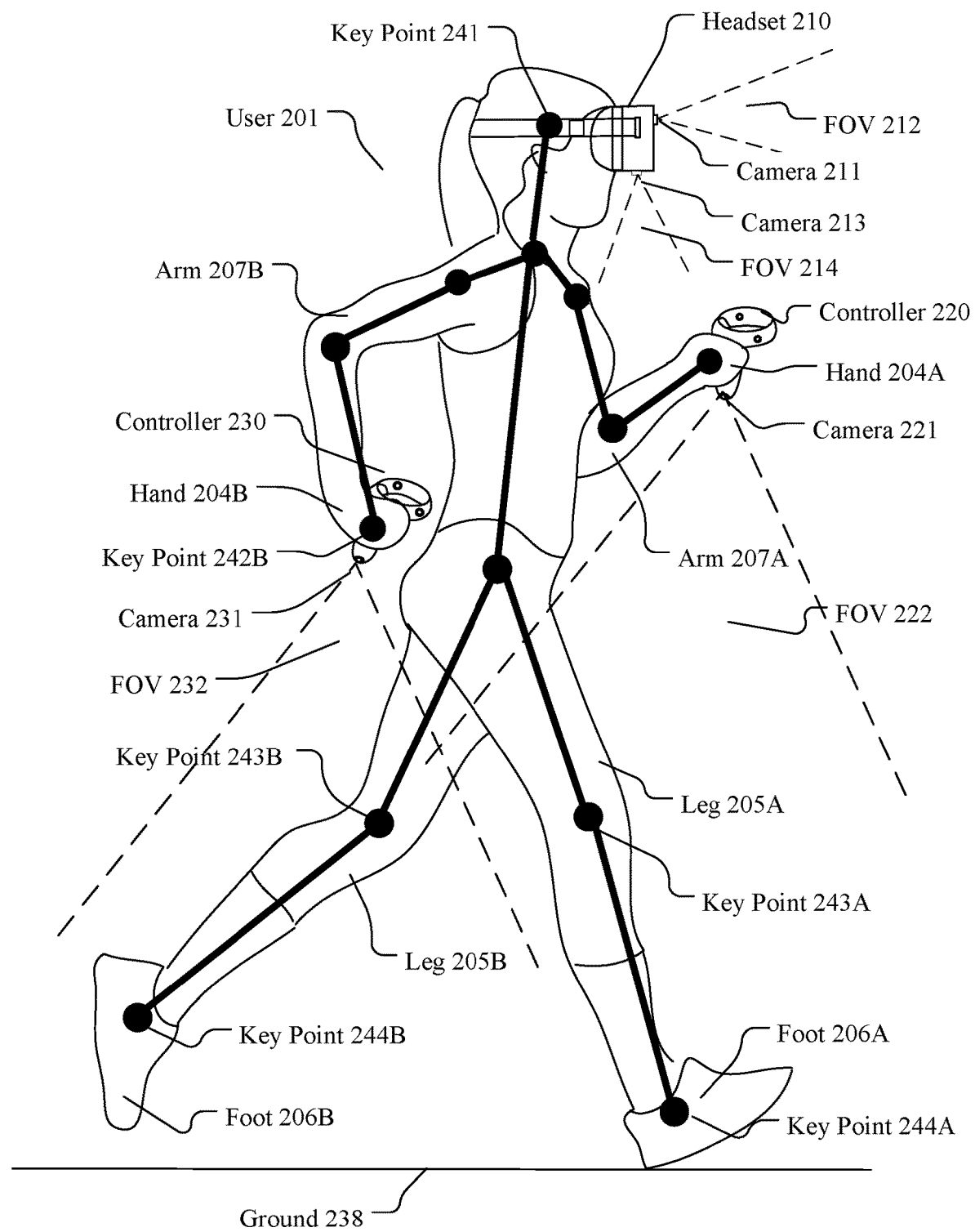
FIG. 2C illustrates an example process of using controller cameras to track the user's lower body parts.

In particular embodiments, the system may use the headset cameras (e.g., 213) that face downward to track the body pose and motion of the user's body parts that are visible to these headset cameras. For example, the camera 213 may be used to track the user's shoulders, elbows, arms, hands, and other upper body parts of the users when these body parts fall within the FOV of the camera 213. However, the body pose estimation using the above method may have some limitations. For example, the system may only have limited number of keypoints (e.g., 242A, 242B, and 241) and the estimated body pose may not be accurate in some situations. Furthermore, the system may not able to estimate the lower-body part (e.g., legs 205A and 205B, feet 206A and 206B) of the user 201 because the lower body parts of the user 201 may not be visible to the headset cameras (e.g., 211, 213) and there may be no controllers or sensors attached to any lower body parts of the user 201. The system may not able to estimate some portions FIG. 2C illustrates an example process 200C of using controller cameras to track the user's lower body parts. In particular embodiments, the system may use one or more controllers (e.g., 220, 230) with respective cameras (e.g., 221, 231) to track the lower body parts of the user 201. For example, the controller 220 may have a camera 221 which has a FOV of 222. Depending on the position of the controller 220 and its orientation in the 3D space, the FOV 222 of the camera 220 may face different directions capturing different body parts of the user 201 or different objects in the surrounding environment. Similarly, the controller 230 may have a camera 231 which has a FOV of 232. Depending on the position of the controller 230 and its orientation in the 3D space, the FOV 232 of the camera 230 may face different directions capturing different body parts of the user 201 or different objects in the surrounding environment. When the user 201 has a body pose as illustrated in FIG. 2C, the camera 221 may capture the images of the user's left leg 205A and left foot 206A. Accordingly, the system may determine the positions for the key point of 244A associated with the user's left foot and the key point 243A for the user's left knee based on the images captured by the camera 221. Similarly, the camera 231 may capture the images of the user's right leg 205B and right foot 206B. Accordingly, the system may determine the key point positions for the keypoints 244B and 243B, which are associated with the user's left foot 206B and left leg 205B, respectively. As illustrated in FIG. 2C, the camera 231 on the controller 230 and the camera 221 on the controller 220 may each capture the user's lower body part from a different perspective. The user's lower body part may or may not be fully captured by a single camera. However, when multiple cameras of the same controller or different controllers are used collectively, the system may obtain sufficient image data to cover the user's lower body part from all perspectives that are needed to determine the user's body pose.

Figure 2D:
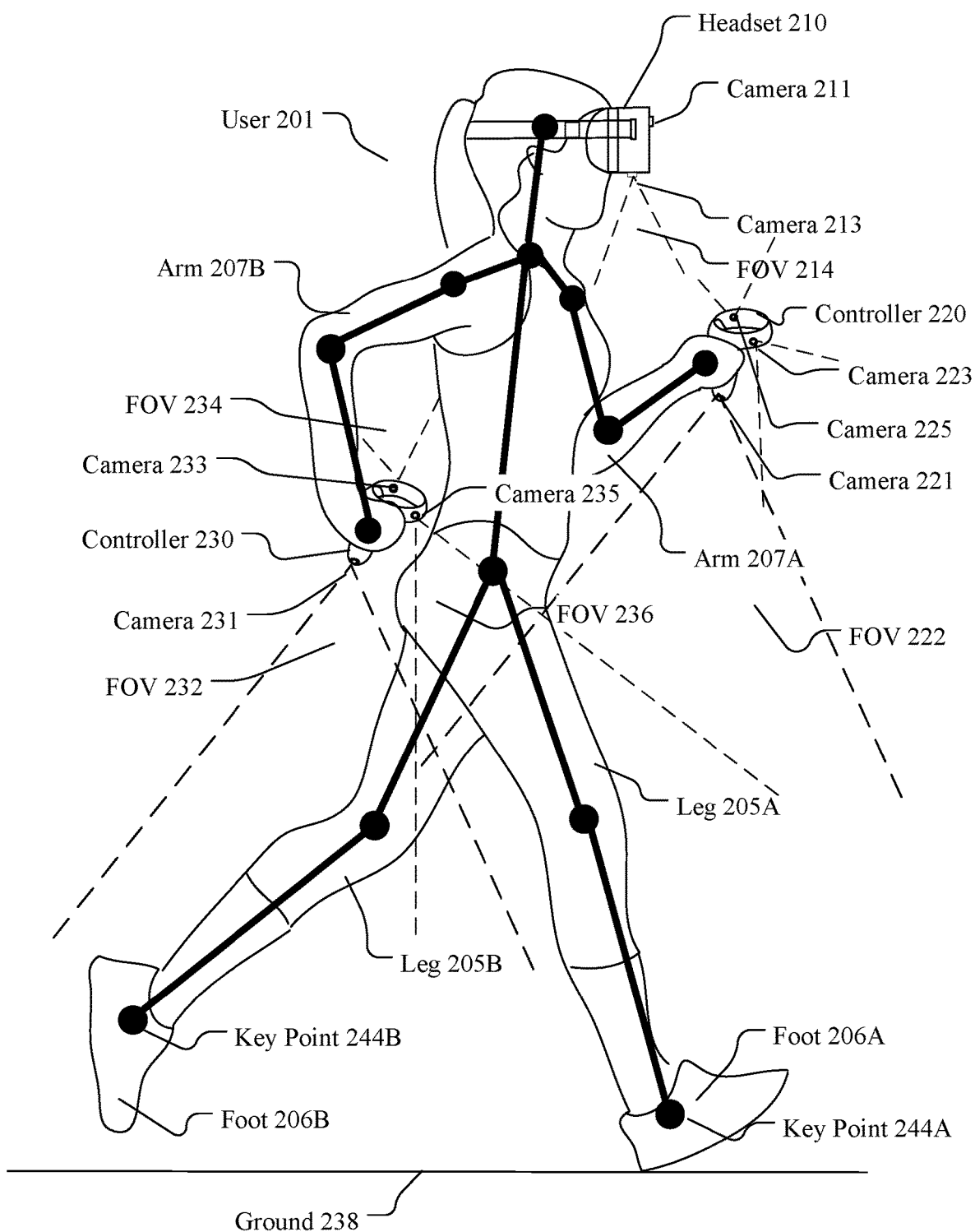
FIG. 2D illustrates an example process of using headset sensors and controller sensors to track the user's full body.

FIG. 2D illustrates an example process 200D of using headset sensors and controller sensors to track the user's full body. In particular embodiments, the system may use headset sensors (e.g., cameras, IMUs) and controller sensors (e.g., cameras, LiDARs, structured light sensors, IMUs, etc.) collectively to track the user's full body. For example, the system may use the IMUs on the headset 211 to determine the head position parameters of the user 201 (e.g., as represented by corresponding keypoints). The head position parameters may include, for example, but not limited to, head distance to the ground 238, a head orientation, a face direction, a moving velocity, a moving direction, a head rotation velocity and rotating direction, etc. As another example, the system may use the headset cameras (e.g., 211, 213) to track the user's body parts and the objects in the surrounding environment (which can be used to infer or confirm the user's body pose and motion parameters). As another example, the system may use the headset cameras (e.g., 213) to track the user's body parts (e.g., an arm, an elbow, and a hand in front of the user's body) that are visible to the headset cameras. As another example, the system may use IMUs on the controllers (e.g., 220, 230) to determine the controller position parameters including, for example, but not limited to, controller positions with the 3D space, controller orientations, a controller moving velocity and moving directions, a controller rotation velocity and rotation directions.

In particular embodiments, the system may use the controller position parameters to determine the corresponding key point positions for the associated user body parts (e.g., two hands holding respective controllers). As another example, the system may use the controller cameras (e.g., cameras 231, 233 and 235 on the controller 230, cameras 221, 223 and 225 on the controller 220) to track the user's body parts that are visible to these cameras. Each camera may capture image of one or more particular body parts of the user 201 from a particular perspective. The controllers may communicate and coordinate with each other and the cameras may collectively capture images of the user's body from different perspectives that are needed to track the user's full body pose. For instance, the cameras 231 and 233 of the controller 230 may capture the images of the lower body part (e.g., legs, knees, feet, etc.) of the user 201. The camera 233 may capture the images of the user's upper body part. Similarly, the camera 221 of the controller 220 may capture the images of the user's lower body part and the camera 225 of the controller 220 may capture the images of the user's upper body part. In this disclosure, the term "full body pose" may refer to a pose of a users' body including both the upper body part and the lower body part of the user. In particular embodiments, the full body pose of the user may include, for example, but are not limited to, the poses of the user's head, neck, shoulders, arms, elbows, hands, body chunk, hips, legs, knees, feet, etc., even though one or more body parts of the user may be not visible or trackable to the headset cameras/sensors. In this disclosure, the term "body pose," "controller pose," or "headset pose" may each be represented by a number of parameters including, for example, but not limited to, a three-dimensional position, one or more three-dimensional orientations, and one or more space angles in the three-dimensional space. In this disclosure, the term "self-tracking controller" or "self-tracked controller" may refer to a controller that can track its own pose parameters (e.g., position, orientation angles, rotation angle, motion, etc.) in the 3D space. A "self-tracking controller" or "self-tracked controller" may include one or more sensors or/and cameras to track its own pose or/and the surrounding environment.

Figure 3A:
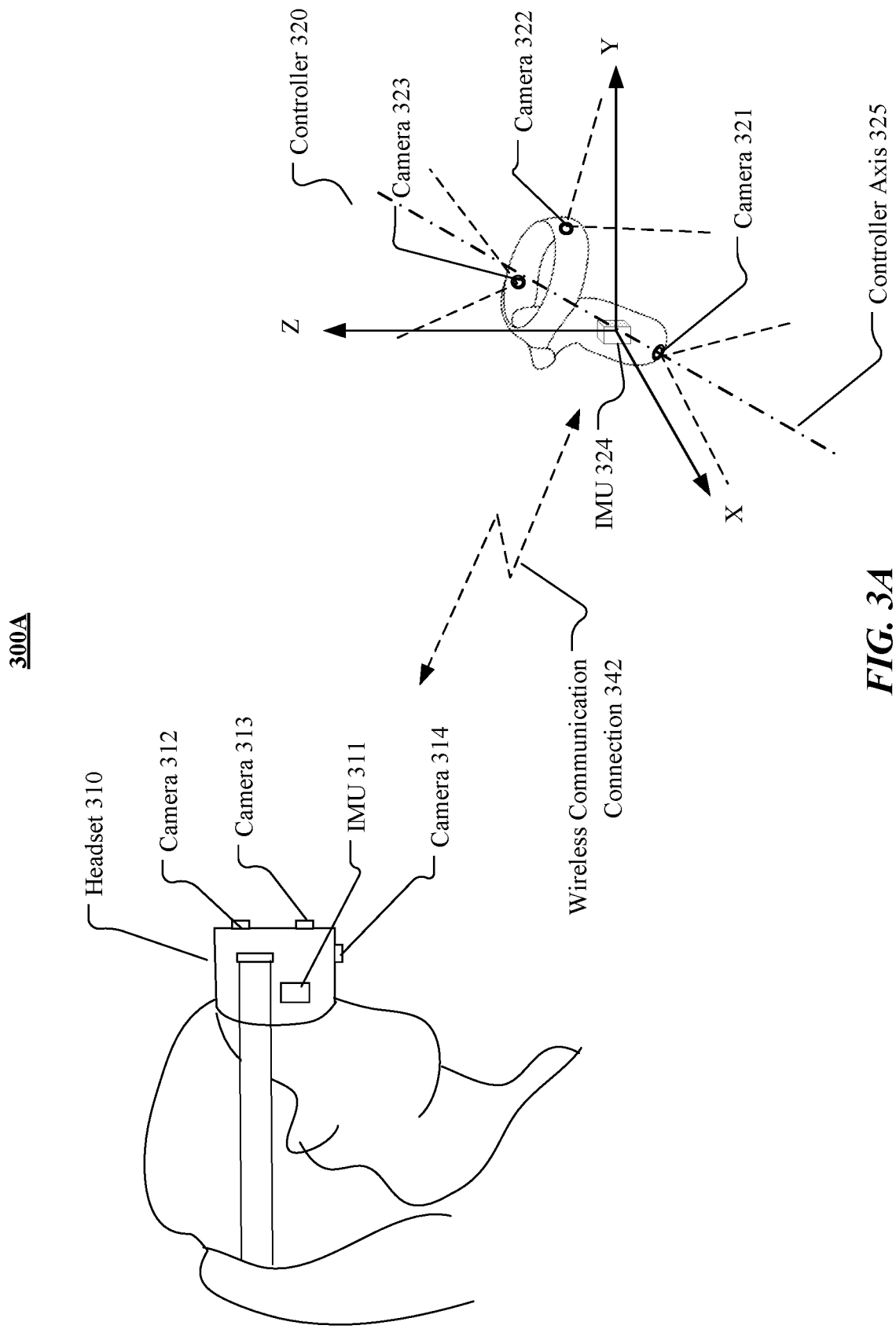
FIG. 3A illustrates an example process of using a self-tracking controller to perform simultaneous localization and mapping (SLAM).

FIG. 3A illustrates an example process 300A of using a self-tracking controller 320 to perform simultaneous localization and mapping (SLAM). In particular embodiments, the system may use a self-tracking controller 320 having IMUs, sensors, and one or more inside-out cameras (e.g., RGB cameras, infrared cameras, lidars, structured light, etc.) to perform the simultaneous localization and mapping (SLAM). The self-tracking controller 320 can use its cameras (e.g., 321, 322, and 323) and the IMU 324 to perform simultaneous localization and mapping (SLAM) for self-localization. For example, the controller 323 may use the IMU 324 to determine the controller position and orientation in the 3D space (as represented by the XYZ coordinate system). The system may first determine the center point position of the controller 320 based on the IMU data. Then, the system may determine the direction of the controller axis 325 and the rotation angle (in a plane perpendicular to the axis 325) of the controller 320 based on the IMU data. After that, the system may determine the FOVs of the cameras (e.g., 321, 322, 323) based on the controller position, controller axis 425 and rotation angle, and corresponding extrinsic parameters of the cameras (e.g., relative installation positions and facing direction of the cameras with respect to the controller). With the camera FOVs determined, the controller 320 may be used to track the user's body parts that fall within the camera FOVs and accurately determine the corresponding key point positions based on the images captured by these controller cameras. In particular embodiments, the headset 310 may include one or more sensors including, for example, but not limited to, IMU 311, cameras (e.g., 312, 313, and 314), LiDARs, structured light sensors, etc. The headset 310 may determine its own position and orientation in the 3D space based on the IMU data. The headset 310 may also use the cameras (e.g., 312, 313, and 314) to capture images of objects in the surrounding environment to determine or confirm the headset position and orientation in the 3D space. The headset 310 and the controller 320 may communicate with each other through a wireless communication connection 342.

Figure 3B:
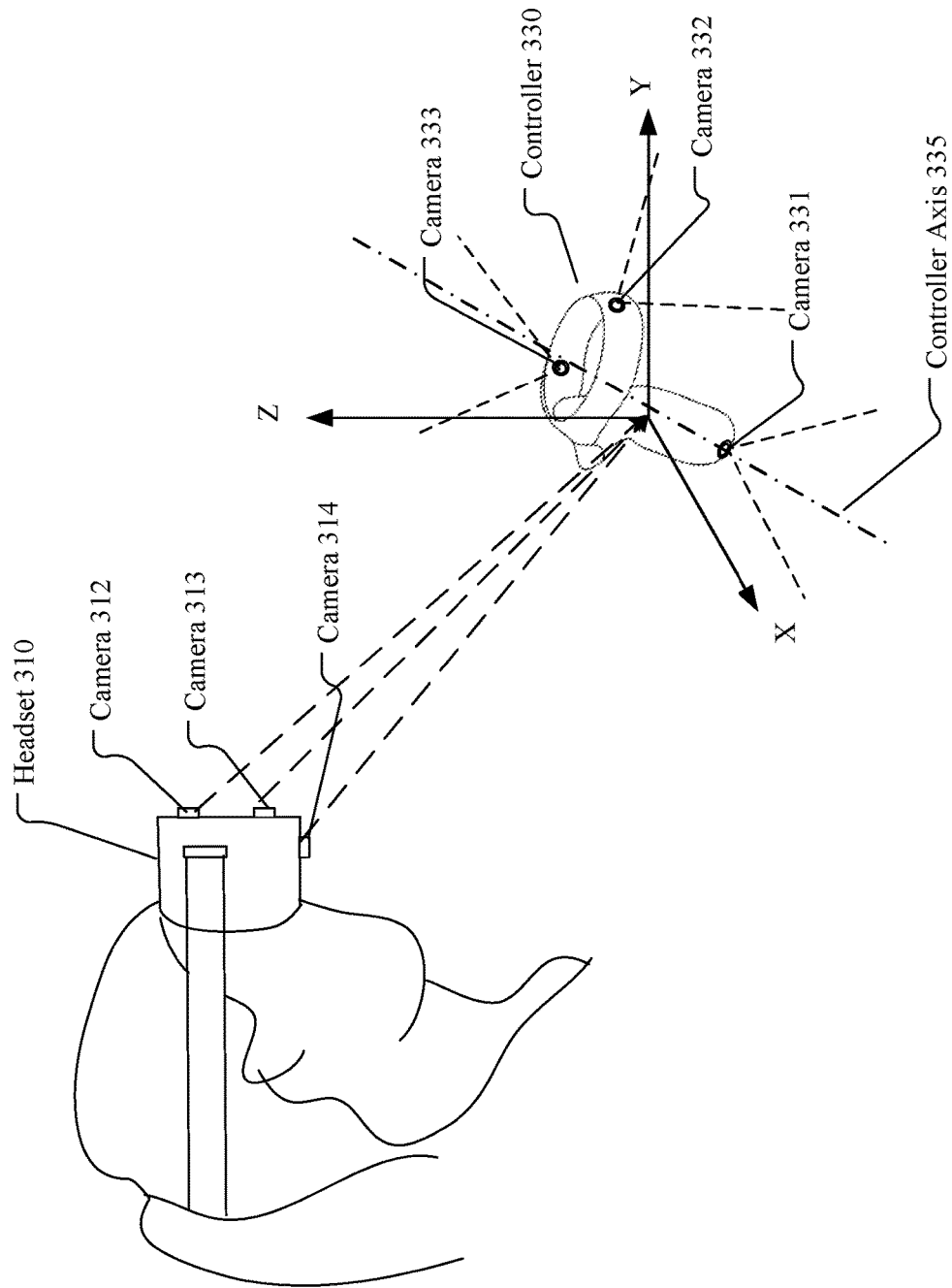
FIG. 3B illustrates an example process of determining the controller position and orientation using the headset sensors.

FIG. 3B illustrates an example process 300B of determining the controller position and orientation using the headset sensors. In particular embodiments, the controller 330 may not need to be self-tracking. Instead, the controller's 3D position and pose in the 3D space may be determined using the headset cameras (e.g., 312, 313, and 314). For example, when the controller 330 falls within the FOVs of two or more headset cameras of 312, 313, and 314, the system may capture images of the controller 330 from different perspectives using the two or more cameras (e.g., 312, 313, and 314). Then, the system may determine the controller position and orientation based on the images of the controller 330 captured from different perspectives by respective cameras (e.g., using the parallax principle). After that, the system may determine the FOVs of the controller cameras (e.g., 331, 332, 333) based on the controller position, the controller axis 335 and the rotation angle, and the corresponding extrinsic parameters of the cameras (e.g., relative installation positions and facing direction of the cameras with respect to the controller). With the camera FOVs determined, the controller 220 may track the user's body parts that fall within the camera FOVs and accurately determine the corresponding key point positions based on the images captured by these controller cameras.

In particular embodiments, the system may use all sensors (e.g., cameras, IMUs) of the headset and controllers to determine the user's body parameters. In particular embodiments, a body part of the user may be directly associated with the headset position or the controller positions (e.g., the head and the user's hands holding the controllers). The system may determine the corresponding keypoints directly based on the associated headset position or the controller positions. For example, the system may use the headset IMU data to determine the head position and head pose in the 3D space and determine the corresponding key point. As another example, the system may use the controller IMU data to determine, for the hand holding that controller, the hand position and hand pose in the 3D space, and determine the corresponding key point.

Figure 3C:
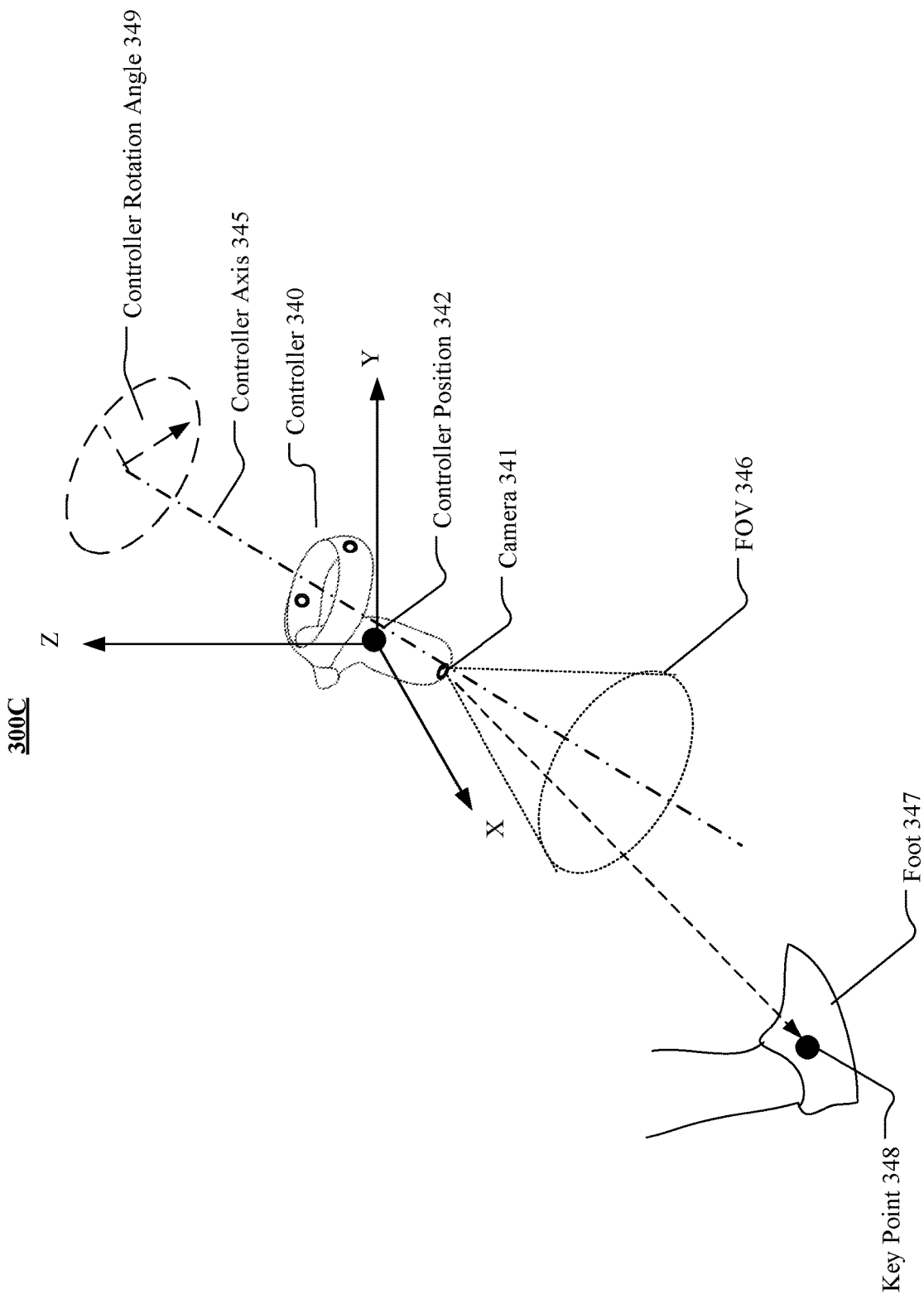
FIG. 3C illustrates an example process for determining a key point associated with a user's body part using controller camera data.

FIG. 3C illustrates an example process 300C for determining a key point associated with a user's body part using controller camera data. In particular embodiments, the user's body part may be visible to a controller camera and the corresponding key point may be determined based on the image of that body part as captured by the controller camera. For example, the system may first determine the controller position (e.g., as represented by the center point 342) and the controller pose (as represented by the controller axis 345 and the rotation angle 349) based on the controller IMU data and/or the controller camera data. Then, the controller 340 may capture the image of the user's foot 347 and determine the position of the key point 348 based on the captured images for the user's foot 347, the camera intrinsic parameters (e.g., a lens distortion mesh, FOV 346), and the camera extrinsic parameters (e.g., the relative position of the camera 341 with respect the controller center point 342). The absolute position of the key point 348 with the 3D space may be determined based on the relative position of the key point 348 with respect to the controller position 342 in the 3D space of XYZ, and the relative position of the foot 347 with respect to the controller camera 341.

In particular embodiments, the user's body part may be visible to multiple controller cameras. The system may determine the corresponding keypoints based on the images captured by the multiple controller cameras. The multiple controller cameras may be associated with a single controller or multiple controllers. In particular embodiments, the multiple cameras that can capture images of the same body part may be associated with a single controller, different controllers, or the headset. Each controller camera may capture the user's body part from a different viewpoint and the images captured from different perspectives by the multiple controller cameras may be used to determine the 3D position of the key point based on the triangulation principle or parallax principle. The system may or may not able to accurately determine the 3D positions of the keypoints based on a single image captured by a single controller camera, but can accurately determine the 3D positions of the keypoints based on the multiple images captured by the multiple controller cameras from different perspectives. In particular embodiments, the system may feed the captured images of the user's body parts to a neural network to determine the corresponding keypoints. The neural network may be trained based on experimental data to extract keypoints for the body parts from the corresponding images. The keypoints determined by the system may be represented by the corresponding 3D positions within the 3D space.

In particular embodiments, two or more controllers may coordinate with each other to determine keypoints positions of one or more tracked body parts of the user. For example, the images captured by a first controller may only cover a small portion of the user's leg and the first controller may not have sufficient data to accurately determine the keypoints related to that leg. However, the images captured by a second controller may cover another small portion of the user leg. The second controller by itself may also do not have sufficient data to determine the keypoints accurately. However, the first controller and the second controller may communicate with each other to synchronize the tracking process. The system may combine the image data from the first controller and second controller to have a better big picture on the user's leg. The combined image data may or may not be complete in capturing the user's leg, but the system may determine the corresponding keypoints with better accuracy. In particular embodiments, the first controller and the second controller may communicate and coordinate with each other directly to capture the images and determine the keypoints collectively. In particular embodiments, the first controller and the second controller may each communicate and coordinate with the headset to capture the images and determine the key point collectively. In particular embodiments, the system may fuse the images of the same body part captured by different controller cameras (e.g., of the same controller or different controllers) from different perspective and use the fused image data to determine the related key point collectively. In particular embodiments, the system may use images captured by a first controller camera to determine the related keypoints and use images captured by a second controller camera to validate or confirm the keypoints as determined based on the images captured by the first controller.

In particular embodiments, the system may use computer algorithms (e.g., a muscular-skeletal model, a machine-learning (ML) model, or a rule-based algorithm) to determine the keypoints for the user body parts that are not visible to the headset cameras and controller cameras nor directly trackable by headset sensors and controller sensors. For example, when the user's foot may not be visible to any headset cameras or controller cameras and not directly trackable by headset sensors or controller sensors. The system may use the muscular-skeletal model to fit the already determined keypoints of the user's other body parts and infer the keypoints of the non-visible body part. The muscular-skeletal model may include a number of constraints derived from the physical limitation of human body and experiential data about human body pose and motion. The keypoints of the non-visible body parts may be determined based on the keypoints of other body parts and the knowledge about human body contained in the muscular-skeletal model. As another example, the system may train a ML model to predict keypoints of non-visible body parts based on the keypoints of the visible (or trackable) body parts. During the training process, the system may first determine all the keypoints of the user's body and use a subset of the known keypoints as the input training samples and another subset of the known keypoints as the ground truth to train the ML model. Once trained, the system may feed the limited number of keypoints that can be directly determined based on sensor data and camera data into the ML model and determine other keypoints that are not directly trackable by the sensors or cameras. At the run time, the system may determine as many as possible keypoints for the user's body parts (e.g., head, hands, visible body parts) and feed the determined keypoints to the ML model to estimate other keypoints of the user's body. As another example, the system may use a rule-based algorithm to process the already determined keypoints and infer the keypoints of other body parts. The rule-based algorithm may include a number of constraints about human body poses and motions that are determined from the physical limitations and characteristics.

In particular embodiments, the system may not be able to determine keypoints of the user body for particular time moments in the time domain. For example, a body part of the user that was previously visible to the controller cameras or headset cameras at a previous moment may become non-visible because of the motion of the user body part. As another example, the headset sensors/cameras and the controller sensors/cameras that are used to track the user's body may use a limited frame rate (e.g., 1 frame per second) to reduce the power consumption and data process burden of the system. Thus, the system may not have the body tracking data for the time moments falling between two consequential frames. In particular embodiments, the system may use an interpolation algorithm to determine the keypoints for these time moments based on the available tracking data. For example, because the user's body motion is generally limited to a maximum possible motion speed, the changing amount of the user body pose between two consequential frames (e.g., 1 second time period) may be limited. The system may use the tracking data (e.g., body part images) before and after that particular moment to determine the keypoints of that particular time moment using interpolation. As another example, the system may train a ML model to predict the user's body keypoints based on the keypoints of previous time moments. The ML model may be trained based on experimental data including both input key point sets and ground truth keypoints sets. At run time, the system may record the keypoints of the user's body that have been determined over a particular time window and feed these keypoints to the ML model to predict the keypoints for the current time moment. The time window used by the system may corresponding to a period of time prior the current time moment and may be a sliding-window moving with time.

In particular embodiments, the system may determine keypoints for the user's body as many as possible using the one or more methods as discussed above, and the aggregate all the keypoints of the user body to determine an initial full body pose. For example, the system may use the headset IMU data to determine the key point for the user's head and use controller IMU data to determine the keypoints for the user's hands. As another example, the system may use the headset/controller camera data (e.g., images) to determine the keypoints for the visible body parts of the user. As another example, the system may use a subset of the keypoints to determine other keypoints of the user based on a muscular-skeletal model or a ML model trained to determine keypoints of the user body based on limited subset of keypoints. As another example, the system may use a ML model to predict the keypoints of the body part for particular time moments based on body tracking data (e.g., previous frames of images) of a time window prior to these particular time moments. The keypoints determined by each method may be an incomplete set of data points for the user's body. However, after all these keypoints are determined, the system may aggregate all these keypoints to determine an initial full body pose of the user. In particular embodiments, the system may determine the keypoints associated with, for example, but not limited to, the user's head, face, neck, shoulders, arms, elbows, hands, hips, body mass center, legs, knees, feet, etc. The initial full body pose may be optimized and refined using the muscular-skeletal model of human body and/or a ML model that is trained to refine the full body pose of the user.

Figure 4:
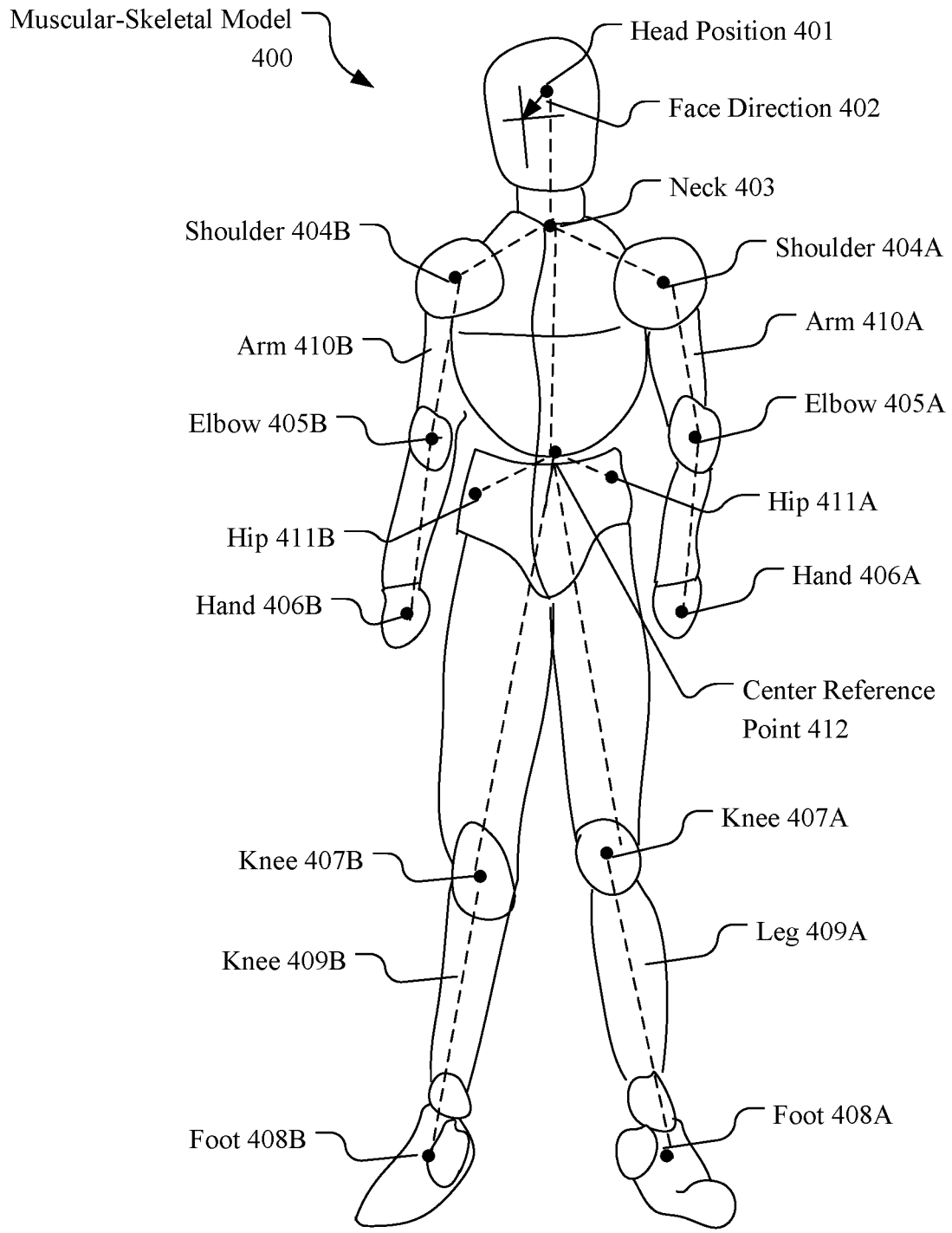
FIG. 4 illustrates an example muscular-skeletal model for human bodies.

FIG. 4 illustrates an example muscular-skeletal model 400 for human bodies. In particular embodiments, the system may use a muscular-skeletal model of human body to (1) infer the positions of the user's body keypoints based on other keypoints; and (2) determine the full body pose of the user based on a full set of keypoints or based on an incomplete set of keypoints. As an example and not by way of limitation, the muscular-skeletal model 400 may include information related to, for example, but not limited to, the user's head position 401, the face direction 402, the neck 402, shoulders 404A and 404B, arms 410A and 410B, elbows 405A and 405B, hands 406A and 406B, hips 411A and 411B, the body center reference point 412, knees 407A and 407B, legs 409A and 409B, feet 408A and 408B, wrists, etc. In particular embodiments, the muscular-skeletal model 400 may be generated by a computer based on theoretical and experiential knowledge about human bodies. For example, the model 400 may include a number of linear line segments to represent the rigid bones and a number of keypoints representing the positions of the key body parts (e.g., joints). As another example, the model 400 may also model the muscles attached to the major bones of the human body, describing how the muscles pull the bone in particular ways (e.g., elastic rather than rigid motion). The muscles may be modelled by finite element method (FEM) simulation first to determine the corresponding attributes, which may be captured by the muscular-skeletal model 400. As a result, the muscular-skeletal model 400 may include a number of constraints for human body pose and motions. The constraints may be determined based the physical limitations of human bodies.

In particular embodiments, the system may use these constraints to infer the user's body posed based on limited tracking data (e.g., using a subset of keypoints to infer the full body pose of the user). For example, the user's forearms can only be bended toward the user's body rather than the opposite direction. The system may use this constraint to exclude a large number of arm poses that do not comply with this constraint and infer the correct arm pose of the user based on a limited number of keypoints. As another example, there may be only a limited number of manners for human bodies to make a particular pose. For instance, the human body can only put a hand behind a particular part of his back from one side because the arm is not long enough to go through the other side. When the system detect the user's hand is at this particular position behind his lower or higher part of his back (e.g., based on the controller position hold in that hand), the system may reasonably infer that the user's arm has to be in that particular arm pose and no other arm pose would be possible in this particular situation.

Figure 5:
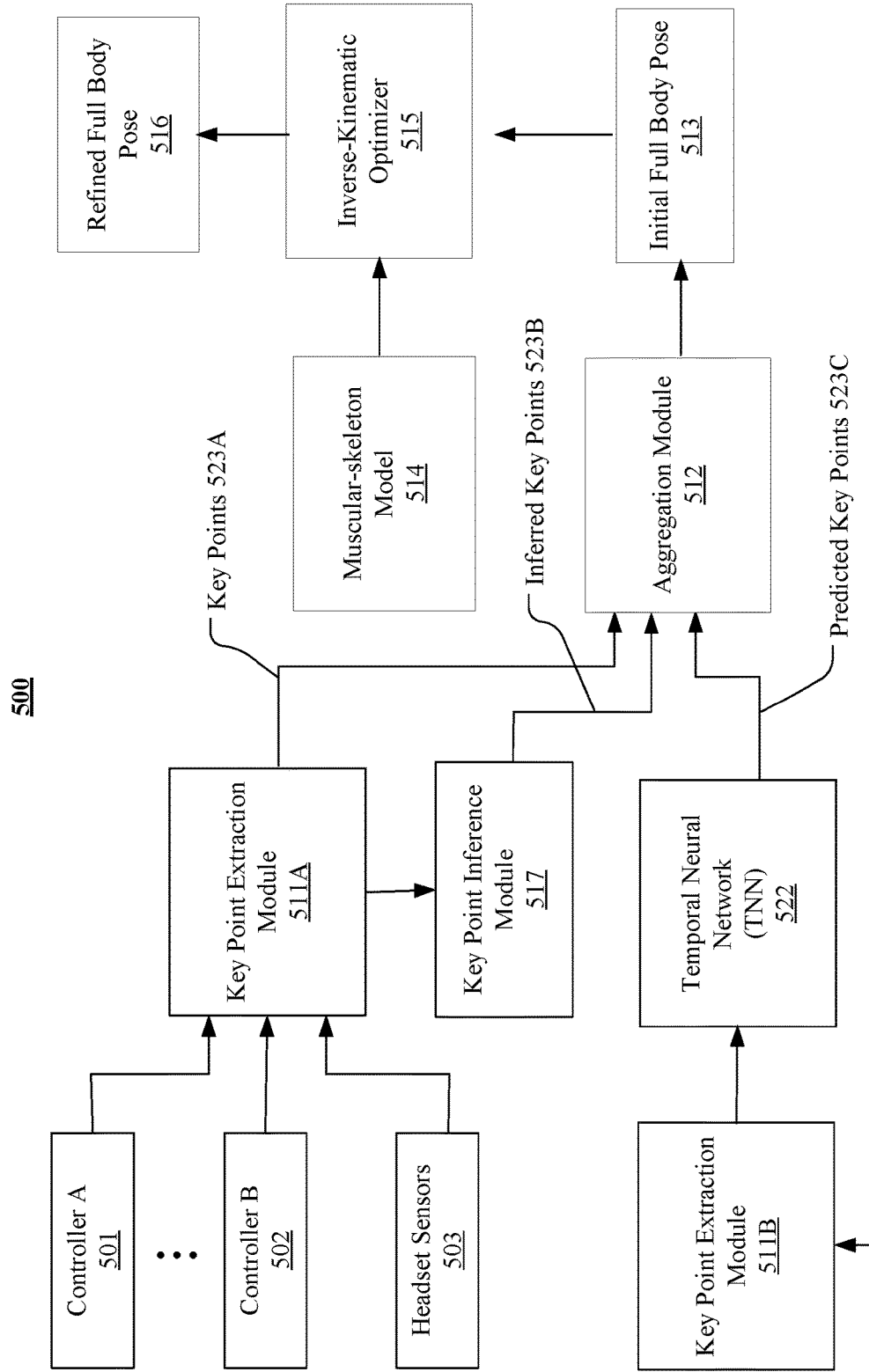
FIG. 5 illustrates an example process of estimating the user's full body pose.

FIG. 5 illustrates an example process 500 of estimating the user's full body pose. In particular embodiments, the system may use the headset sensors 503 (e.g., IMUs, cameras) to track the user's body parts. In addition, the system may use one or more controllers (e.g., 501, 502) with sensors (e.g., cameras, IMUs) to tack the user's body parts that are not visible to the headset cameras or trackable by the headset sensors. For example, the system may use the headset cameras and the controller cameras to capture the images of the user's body parts falling with the FOVs of these cameras. The system may feed these images to a key point extraction module 511A to determine the corresponding keypoints. The key point extraction module 511A may be an image process algorithm that can process the input images (and IMU data) to determine the corresponding key point positions. In particular embodiments, the key point extraction module 511A may be a ML model that is trained to extract keypoints and determine the 3D positions for these keypoints based in input images. In particular embodiments, the keypoints of the user body part may be determined based on the captured images, the headset IMU data, the controller IMU data, and the extrinsic and intrinsic parameters of these cameras (e.g., relative positions of the cameras with respect to the controller or headset, FOVs). After the keypoints are determined, the system may input the determined keypoints 523A to the aggregation module 512 which may aggregate the keypoints of different body parts into an initial full body pose 513.

In particular embodiments, the system may need to determine one or more keypoints associated with one or more body parts that are not visible to the headset/controller cameras and are not directly trackable by the headset sensors and controller sensors. The system may input the set of keypoints that has been determined (e.g., associated with the visible body parts or directly trackable by headset/controller sensors) base on the available camera or sensor data to the key point inference module 517, which may infer the 3D positions of the other keypoints based on the 3D positions of the known keypoints. In particular embodiments, the key point inference module 517 may be a muscular-skeletal model of human body that includes a number of constraints about possible human body poses and motion. The system may infer the positions of the other keypoints based on the relationships between the corresponding body parts based on the muscular-skeletal model. In particular embodiments, the key point inference module 517 may be a ML model that is trained based on experiential data to predict the positions of keypoints based on other keypoints that have been determined. After the inferred keypoints 523B are determined, the system may input these inferred keypoints to the aggregation module 512, which may aggregate all the keypoints to determine the initial full body pose 513.

In particular embodiments, the system may need to determine keypoints of body parts that cannot be directly or indirectly determined based on the real-time sensor data (e.g., camera images, IMU data) for the current time moment. For example, one body part of the user may be hidden behind other body parts and the system may not able to directly track the hidden body part by the headset/ controller cameras or sensors. And, because the system may be able to determine only a limited number of keypoints for the user body, the system may not have sufficient real-time data to infer the keypoints for the hidden body parts. To solve this problem, in particular embodiments, the system may use the sensor and camera data of a sliding time window prior to the current time moment to determine the keypoints for the hidden body parts. For example, a currently hidden body party may be visible to headset cameras or controller cameras in previous frames. The system may access the previously image frames 521 of the currently hidden body parts to infer the current key point positions for these body parts. The system may input the previous frames 521 to the key point extracting module 511B to determine the current key point positions (corresponding to the previous time moments). Then, the system may feed the previous keypoints into a temporal neural network (TNN) 522 to infer the current positions for these keypoints. The temporal neural network (TNN) 522 may be a ML model that is trained to predict the current key point positions based on the previous key point positions. The temporal neural network (TNN) 522 may take in the keypoints and/or the sensor data of a sliding time window prior to the current time moment and determine (predict) the current positions for the corresponding keypoints. After these keypoints are determined, the system may feed these predicted keypoints 523C into the aggregation module 512 to determine the initial full body pose 513. As a result, the aggregation module 512 may receive and aggregate keypoints that are directly or indirectly determined based on the current sensor/camera data and the keypoints that are predicted based on the previous frames into a whole to determine the initial full body pose 513. The keypoints that are input into the aggregation module 512 may be associated with different body parts and may be determined based on data from different sources (e.g., headset camera images, controller camera images, headset sensor data, controller sensor data). The keypoints determined based on each data source may have an incomplete set of keypoints, but the keypoints determined based on different data sources may collectively provide a whole set of keypoints for the user's full body pose.

In particular embodiments, the system may determine the initial full body pose 513 by aggregating all the keypoints that are determined for the user's body in the prior steps. However, the initial full body pose 513 may be not perfectly accurate for some body parts. For example, the inferred keypoints 523B based on other keypoints and the predicted keypoints 523C based on previous frames may be not 100% in accordance with the user's actual body part positions at the current time moment. Furthermore, even the keypoints determined based on different data sources are in accordance with the actual body part positions, the initial full body pose may deviate from the actual body pose because of the aggregation process may generate some deviations (e.g., having errors in relative positions of between different body parts of the user). As a result, the initial full body pose 513 may provide a rough estimation for the user's body pose and may not be perfectly accurate. The system may feed the initial full body pose 513 to an inverse-kinematic optimizer to refine and optimize the results. For example, the initial full body pose 513 may include all the keypoints that have been determined for the user's body. The inverse kinematic optimizer 515 may be ML model that is trained to optimize the key point positions based on the relationships of corresponding body parts. For example, the inverse kinematic optimizer 515 may fit the input keypoints based on the muscular-skeletal model 514 to determine if any key point positions or key point relationships are not complying with the muscular-skeletal model and to make adjustment to accordingly to determine the optimal body pose of the user. The muscular-skeletal model 514 may include a number of constraints limiting the possible body pose of the user and these constraints may be applied by the inverse kinematic optimizer 515. As a result, the refined full body pose 516 may provide more accurate body pose estimation results than the initial full body pose 513.

In particular embodiments, the system may determine an estimated body pose of the user using one or more steps as described in this disclosure. However, in some situations, the estimated body pose of the user may have one or more portions that do not comply with the constraints of the muscular-skeletal model for human bodies. In such situations, the system may adjust those non-complying portions according to these constraints and make the estimated body pose to comply with such constraints. For example, the estimated body pose may have an arm bending backward which is impossible for human bodies. The system may reverse the bending direction or output another pose for that arm based on the body poses of other body parts and the context of the user's activities. As another example, the system may detect a sudden change in a body part that exceeds the maximum possible speed human bodies can make. The system reduce that change into a speed that is realistic to human bodies according to the muscular-skeletal model.

In particular embodiments, the system may use the body part shape (e.g., profiles, envelopes) or the full body shape as determined based on headset cameras images or controller camera images to refine the full body pose as determined based on the keypoints. As discussed earlier, different sets of keypoints may be associated with different body parts and may be determined based on different data sources. The relationship between different set of keypoints may be refined or recalibrated based on the overall body shape of the related body parts. For example, the system may determine the body poses of two related body parts based on the corresponding two sets of keypoints, the overall body shape of the two parts, and the muscular-skeletal model. As a result, the system may have more accurate estimation results for the full body pose of the user.

In particular embodiments, the system may only capture limited data for determining the user's body pose and even the refined body pose results may not able to accurately reflect the actual body pose of the user for particular time moments. The system may use the muscular-skeletal model for human bodies, the limited sensor/camera date, and the context of the user's ongoing activities, to determine the most possible or suitable body pose for the user in this situation. For example, the system may determine whether the user is playing a game, chatting with a friend in a virtual environment, having a tel-conference with multiple people remotely, watching a concert virtually with friends, etc. The system may determine the estimated body pose of the user based on the context and characteristics of the user's activities. For example, if the user is standing and chatting with a friend in a virtual environment, the system may output a body pose of the user that fits into the context of chatting, for example, the user may likely have his legs crossed in a relax body pose when chatting with friend. The user may slightly pose one foot in front another. The user may shift his legs and feet when the chatting becomes heated. As another example, if the user is playing a game that require a lot of running, the system may output a body pose and motion in a running state. As another example, if the user is listening to a concert with music, the system may output a body pose and motion that is incoherent with the beats of the music (e.g., tapping one or two feet in according with the music). As a result, even though the limited data may not allow the system to accurately determine the actual body pose (e.g., the lower body part that is invisible and uncrackable), the system may output the body pose for the user that makes sense to the context of the activities and comply with the constraints of the muscular-skeletal model for human bodies. By outputting this inaccurate but possible and context-suitable body poses, the system may provide a more realistic user experience for the users of interacting with each other through the AR/VR systems, even when only limited data is available for body pose estimation.

In particular embodiments, the system may distribute the computation tasks for processing the sensor data (e.g., IMU data, image data), determining the keypoints, and estimating the full body pose among the headset, the controllers, and/or a separate computing unit (e.g., a phone/stage). All of these system components may be part of the "computing system" referred in this disclosure. In particular embodiments, each controller may process its sensor data (e.g., IMU data camera data) and determine the corresponding keypoints locally within the controller. The controller may send the processed data (e.g., the controller pose, the keypoint positions) to other controllers, the headset, or other local computing units to determine the full body pose of the user. In particular embodiments, the multiple controllers may communicate and coordinate with each other to process the sensor data and determine the corresponding keypoints. For example, the controllers may synchronize the image capturing process with each other and exchange the sensor data (e.g., IMU data and raw images) with each other to collectively determine the corresponding keypoints and the user's full body pose. These keypoints may be determined based on the fusion of sensor data (e.g., IMU data, image data) from multiple controllers. In particular embodiments, the controllers may send their raw sensor data (e.g., IMU data, image data) to the stage/headset, which may process the images and IMU data, determine the keypoint positions, and estimate the full body pose of the user. In particular embodiments, the computation tasks may be allocated to the controllers, the stage/headset, and/or the local computing devices (e.g., a smartphone/stage) based on an optimized scheme depending on one or more factors including the availability of computational resources, the computational task characteristics, the data security scheme, and the privacy settings as set by the user, etc.

Figure 6:
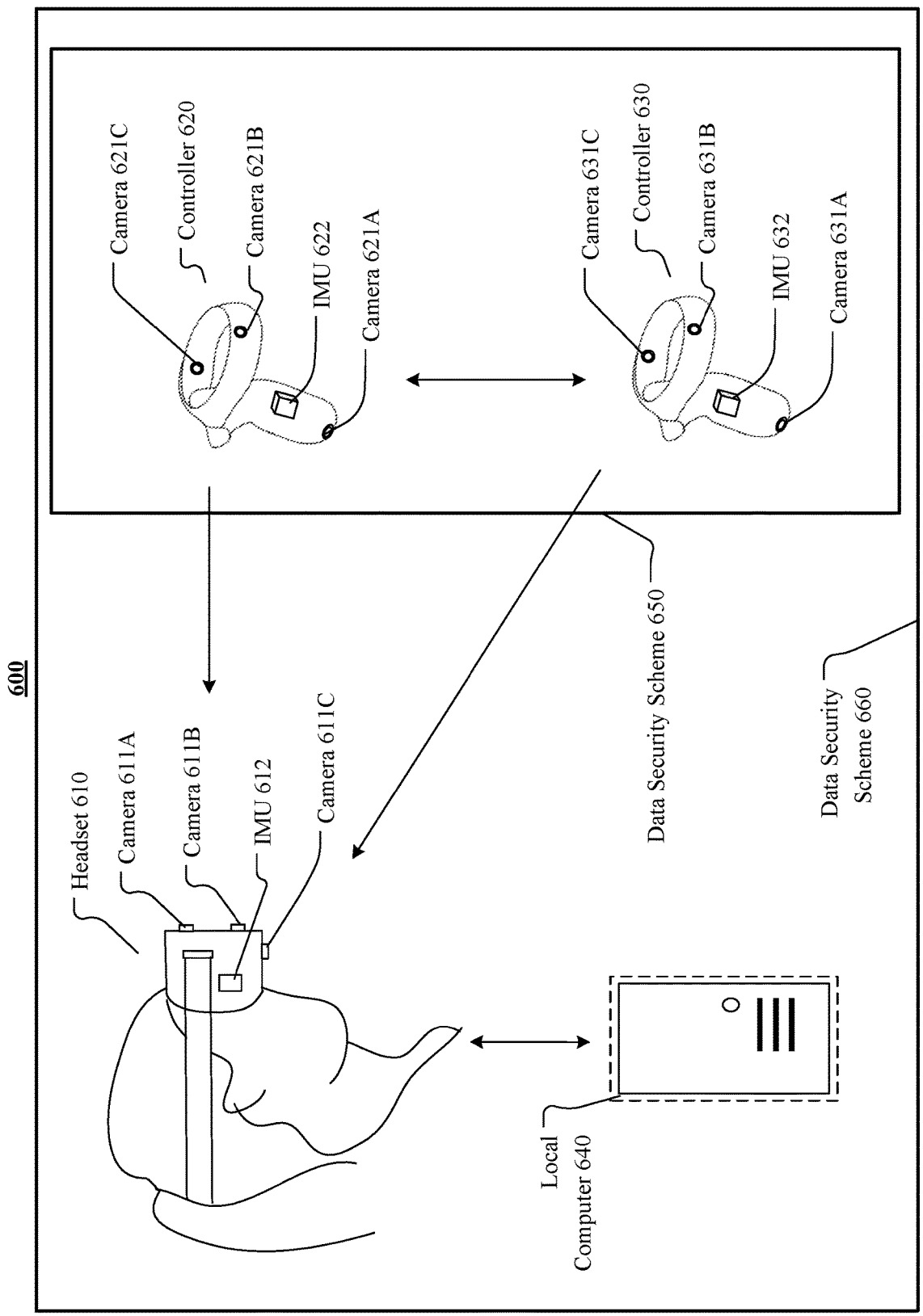
FIG. 6 illustrates an example scheme for data security and user privacy protection.

FIG. 6 illustrates an example scheme 600 for data security and user privacy protection. In particular embodiments, the system may use the controller cameras or headset cameras to track the user's body pose only when the user actively and affirmatively chooses to opt-in asking the system to provide this functionality. The system will not track the user's body pose unless the user has authorized and permitted the system to do so. Even with the user's authorization and permission, the system may provide extra protection to the user's privacy by processing the data locally with the controllers, the headset or the local computers and strictly keeping the data within the local computing systems. As an example, the system may adopt a strict data security scheme 650 which requires the controller 620 and 630 to process all captured images locally within the respective controllers. All raw image data captured by the controllers 620 and 630 may be strictly kept within the respective controllers. The controllers 620 and 630 may only transmit the processed results (e.g., the key point positions) to the headset 610 or the local computer 640. The controllers 620 and 630 may communicate with each other to exchange the key point information but the raw images of captured by each controller may be strictly kept within respective controllers. As another example, the system may adopt a data security scheme 660 which requires all the image data captured either by the headset cameras (e.g., 611A, 611B, 611C) or the controller cameras (e.g., cameras 621A, 621B, and 621C of the controller 620, cameras 631A, 631B, and 631C of the controller 630) to be kept within the local headset 610 or the local computer 640. The images may be transmitted from respective controllers of 620 and 630 to the headset 560 and may be processed locally within the headset 610. Alternatively, the images may be processed by the local computer 640. However, the image data will be strictly kept within the local computing systems (e.g., the local computer 640 or the headset 610) and will be restricted from being transmitted to any computers beyond the local computing systems.

In particular embodiments, after the user's full body pose is determined, the system may use the user's full body pose data to facilitate a more realistic user experience for the AV/VR content. In particular embodiments, the system may use the full body pose data to control an avatar that is displayed to another user interacting or communicating with the user. For example, two users may use the system to conduct a virtual tel-conference with each user being represented by an avatar or a realistic artificial reality character. The system may track each user's full body pose in real-time or close-real-time during the conference and use the full body pose data to control the respective avatars or artificial reality character to allow the user to see each other's full body pose (e.g., as represented by the body pose of the avatar). In particular embodiments, the system may use the full body pose data to facilitate a more realistic sound to the user. For example, the system may, based on the real-time body pose of the user, control different sound sources (e.g., speakers surrounding the user) to create a realistic stereo sound effect to the user.

Figure 7:
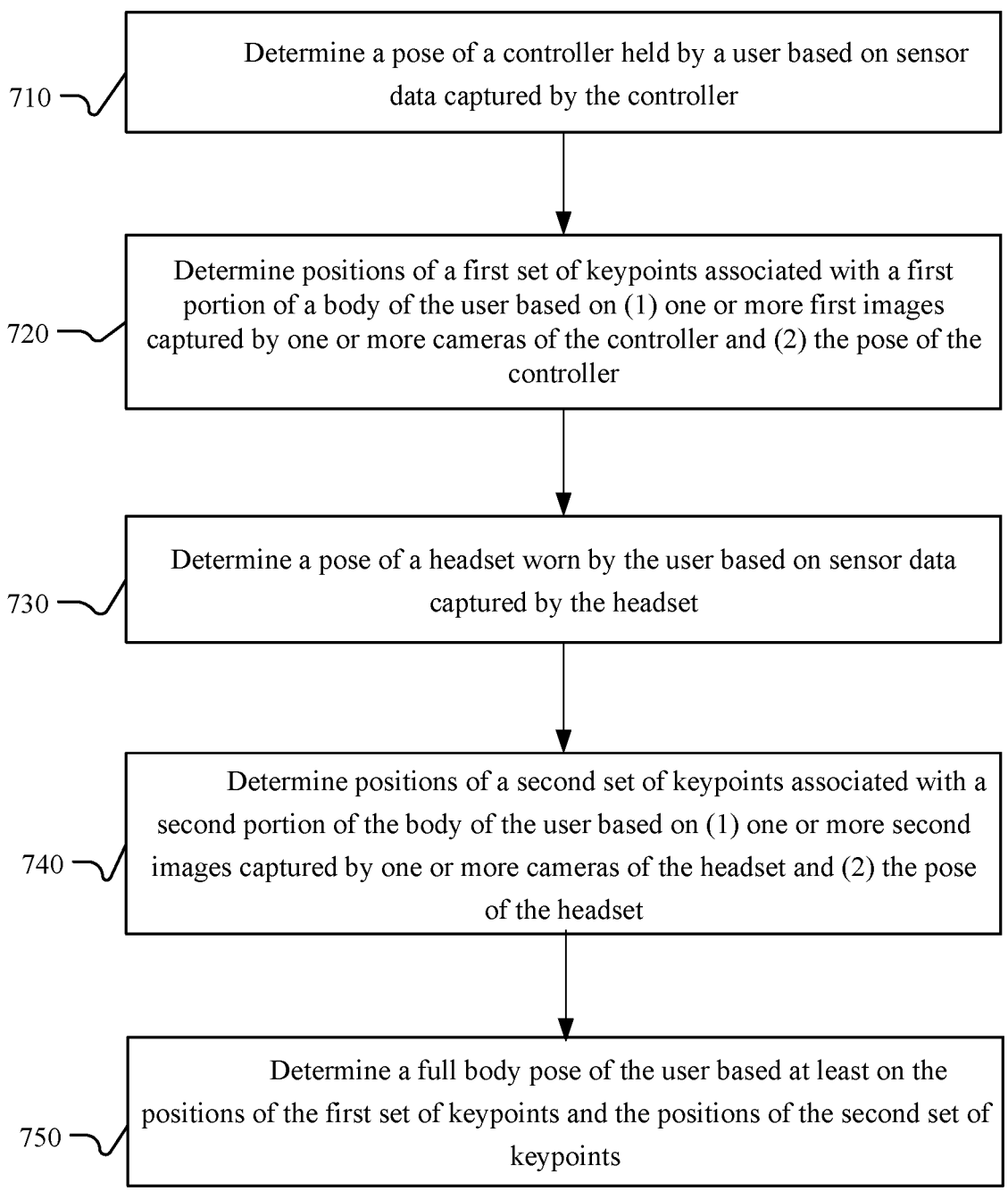
FIG. 7 illustrates an example method of determining a full body pose of the user using a self-tracking controller.

FIG. 7 illustrates an example method 700 of determining a full body pose of the user using a self-tracking controller. The method may begin at step 710, where a computing system may determine, a pose of a controller held by a user based on sensor data captured by the controller. At step 720, the system may determine positions of a first set of keypoints associated with a first portion of a body of the user based on (1) one or more first images captured by one or more cameras of the controller and (2) the pose of the controller. At step 730, the system may determine a pose of a headset worn by the user based on sensor data captured by the headset. At step 740, the system may determine positions of a second set of keypoints associated with a second portion of the body of the user based on (1) one or more second images captured by one or more cameras of the headset and (2) the pose of the headset. At step 750, the system may determine a full body pose of the user based at least on the positions of the first set of keypoints and the positions of the second set of keypoints. In particular embodiments, the pose of the controller may include a position, an axis direction, and a rotation angle of the controller within a three-dimensional space. The pose of the headset may include a position and two axis directions of the headset within the three-dimensional space. In particular embodiments, the sensor data captured by the controller may include inertial measurement unit (IMU) data. The pose of the controller may be determined using simultaneous localization and mapping (SLAM) for self-localization. In particular embodiments, the system may determine a third set of keypoints for a third portion of the body of the user based on a direct correlation (e.g., a hand holding the controller) between the third portion of the body of the user and the pose of the controller (excluding the one or more first images). In particular embodiment, the system may determine a third set of keypoints for a third portion of the body of the user based on a direct correlation (e.g., the user head wearing the headset) between the third portion of the body of the user and the pose of the headset (excluding the one or more second images).

In particular embodiments, the system may determine positions of a third set of keypoints associated with the first portion of the body of the user based on one or more third images captured by one or more cameras of a second controller. The one or more third images may capture the first portion of the body of the user from a perspective different from the one or more first images captured by the one or more cameras of the controller. In particular embodiments, the system may aggregate the first set of keypoints, the second set of keypoints, and the third set of keypoints. The system may feed the aggregated first, second, and third sets of keypoints into an inverse-kinematic optimizer. The full body pose of the user may be determined using the inverse-kinematic optimizer. In particular embodiments, the inverse-kinematic optimizer may include one or more constraints determined based on a muscular-skeletal model. The full body pose of the user may be determined under the one or more constraints and the muscular-skeletal model. In particular embodiments, the system may feed previously determined keypoints associated with one or more portions of the body of the user to a temporal neural network (TNN). The previously determined keypoints may be determined based on previously images of the one or more portions of the body of the user. The system may determine, by the temporal neural network (TNN), one or more predicted keypoints associated with the one or more portions of the body of the user based on the previously determined keypoints associated with the one or more portions of the body of the user. The temporal neural network may be trained using historical data. In particular embodiments, the full body pose of the user may be determined based on the one or more predicted keypoints associated with the one or more portions of the body of the user.

In particular embodiments, the one or more first images may be processed locally within the controller. The system may prevent the one or more first images from being transmitted outside the controller. The system may transmit the first set of keypoints to the headset and the full body pose of the user may be determined locally within the headset. In particular embodiments, the system may transmit the one or more first images to the headset. The one or more first images may be processed locally by one or more computing units of the headset. The first set of keypoints may be determined locally within the headset. The system may prevent the one or more first images and the first set of keypoints from being transmitted outside the headset. In particular embodiments, the full body pose of the user may cover the first portion of the body of the user and the second portion of the body of the user. The first portion of the body of the user may fall outside fields of view of the one or more cameras of the headset. In particular embodiments, the full body pose of the user may include at least a head pose determined using an inertial measurement unit associated with the headset, a hand pose determined based on the pose of the controller, a lower-body pose determined based on the one or more first images captured by the one or more cameras of the controller, and a upper-body pose determined based on the one or more second images captured the one or more cameras of the headset.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for determining a full body pose of the user using a self-tracking controller including the particular steps of the method of FIG. 7, this disclosure contemplates any suitable method for determining a full body pose of the user using a self-tracking controller including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
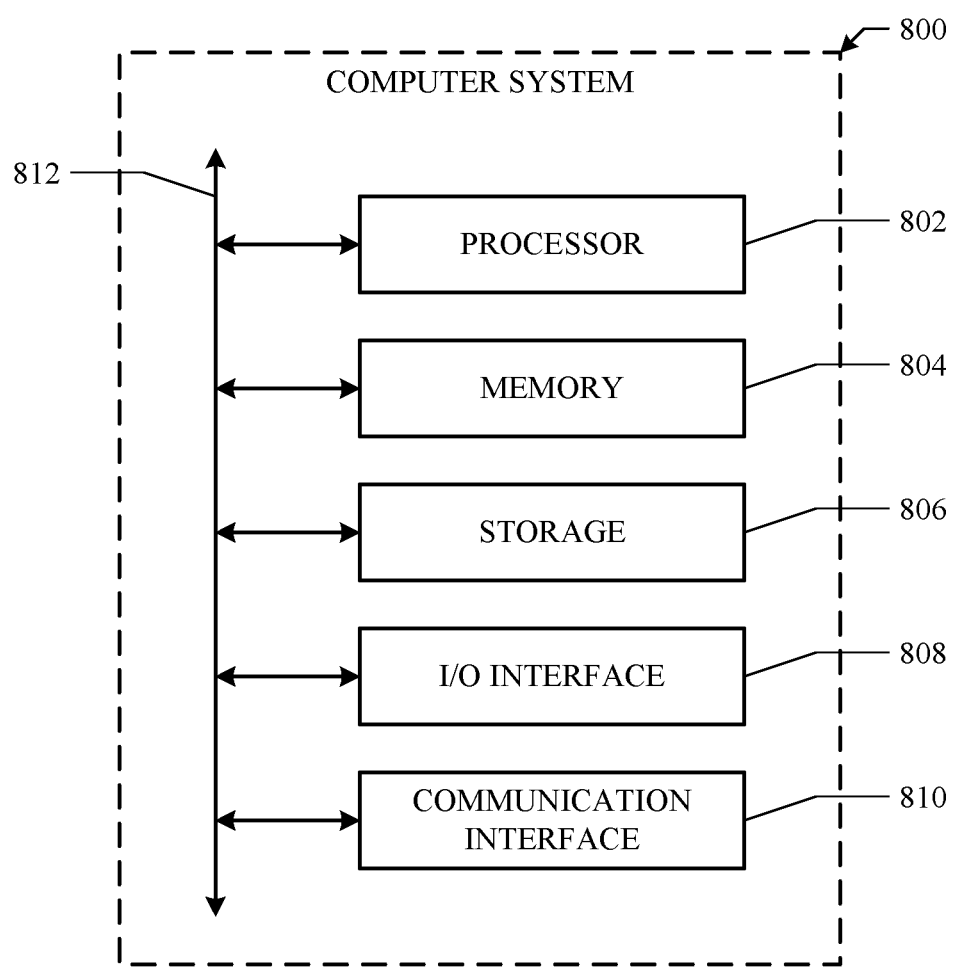
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    determining a pose of a controller held by a user based on sensor data captured by the controller;
    determining positions of a first set of keypoints associated with a first portion of a body of the user based on (1) one or more first images captured by one or more cameras of the controller and (2) the pose of the controller;
    determining a pose of a headset worn by the user based on sensor data captured by the headset;
    determining positions of a second set of keypoints associated with a second portion of the body of the user based on (1) one or more second images captured by one or more cameras of the headset and (2) the pose of the headset; and
    determining a full body pose of the user based at least on the positions of the first set of keypoints and the positions of the second set of keypoints.

2. The method of claim 1, wherein the pose of the controller comprises a position, an axis direction, and a rotation angle of the controller within a three-dimensional space, and wherein the pose of the headset comprises a position and two axis directions of the headset within the three-dimensional space.

3. The method of claim 1, wherein the sensor data captured by the controller comprises inertial measurement unit (IMU) data, and wherein the pose of the controller is determined using simultaneous localization and mapping (SLAM) for self-localization.

4. The method of claim 1, further comprising:
    determining a third set of keypoints for a third portion of the body of the user based on a direct correlation between the third portion of the body of the user and the pose of the controller.

5. The method of claim 1, further comprising:
    determining a third set of keypoints for a third portion of the body of the user based on a direct correlation between the third portion of the body of the user and the pose of the headset.

6. The method of claim 1, further comprising:
    determining positions of a third set of keypoints associated with the first portion of the body of the user based on one or more third images captured by one or more cameras of a second controller, wherein the one or more third images capture the first portion of the body of the user from a perspective different from the one or more first images captured by the one or more cameras of the controller.

7. The method of claim 6, further comprising:
aggregating the first set of keypoints, the second set of keypoints, and the third set of keypoints; and
feeding the aggregated first, second, and third sets of keypoints into an inverse-kinematic optimizer, wherein the full body pose of the user is determined using the inverse-kinematic optimizer.

8. The method of claim 7, wherein the inverse-kinematic optimizer comprises one or more constraints determined based on a muscular-skeletal model, and wherein the full body pose of the user is determined under the one or more constraints and the muscular-skeletal model.

9. The method of claim 1, further comprising:
feeding previously determined keypoints associated with one or more portions of the body of the user to a temporal neural network (TNN), wherein the previously determined keypoints are determined based on previously images of the one or more portions of the body of the user; and
determining, by the temporal neural network (TNN), one or more predicted keypoints associated with the one or more portions of the body of the user based on the previously determined keypoints associated with the one or more portions of the body of the user, wherein the temporal neural network is trained using historical data.

10. The method of claim 9, wherein the full body pose of the user is determined based on the one or more predicted keypoints associated with the one or more portions of the body of the user.

11. The method of claim 1, wherein the one or more first images are processed locally within the controller, further comprising:
preventing the one or more first images from being transmitted outside the controller; and
transmitting the first set of keypoints to the headset, and wherein the full body pose of the user is determined locally within the headset.

12. The method of claim 1, further comprising:
transmitting the one or more first images to the headset, wherein the one or more first images are processed locally by one or more computing units of the headset, and wherein the first set of keypoints are determined locally within the headset; and
preventing the one or more first images and the first set of keypoints from being transmitted outside the headset.

13. The method of claim 1, wherein the full body pose of the user covers the first portion of the body of the user and the second portion of the body of the user, and wherein the first portion of the body of the user falls outside fields of view of the one or more cameras of the headset.

14. The method of claim 1, wherein the full body pose of the user comprises at least: a head pose determined using an inertial measurement unit associated with the headset, a hand pose determined based on the pose of the controller, a lower-body pose determined based on the one or more first images captured by the one or more cameras of the controller, and a upper-body pose determined based on the one or more second images captured the one or more cameras of the headset.

15. One or more computer-readable non-transitory storage media embodying software that is operable when executed to:
determine a pose of a controller held by a user based on sensor data captured by the controller;
determine positions of a first set of keypoints associated with a first portion of a body of the user based on (1) one or more first images captured by one or more cameras of the controller and (2) the pose of the controller;
determine a pose of a headset worn by the user based on sensor data captured by the headset;
determine positions of a second set of keypoints associated with a second portion of the body of the user based on (1) one or more second images captured by one or more cameras of the headset and (2) the pose of the headset; and
determine a full body pose of the user based at least on the positions of the first set of keypoints and the positions of the second set of keypoints.

16. The media of claim 15, wherein the pose of the controller comprises a position, an axis direction, and a space angle of the controller within a three-dimensional space, and wherein the pose of the headset comprises a position and two axis directions of the headset within the three-dimensional space.

17. The media of claim 16, wherein the sensor data captured by the controller comprises inertial measurement unit (IMU) data, and wherein the pose of the controller is determined using simultaneous localization and mapping (SLAM) for self-localization.

18. A system comprising:
one or more non-transitory computer-readable storage media embodying instructions; and
one or more processors coupled to the storage media and operable to execute the instructions to:
determine a pose of a controller held by a user based on sensor data captured by the controller;
determine positions of a first set of keypoints associated with a first portion of a body of the user based on (1) one or more first images captured by one or more cameras of the controller and (2) the pose of the controller;
determine a pose of a headset worn by the user based on sensor data captured by the headset;
determine positions of a second set of keypoints associated with a second portion of the body of the user based on (1) one or more second images captured by one or more cameras of the headset and (2) the pose of the headset; and
determine a full body pose of the user based at least on the positions of the first set of keypoints and the positions of the second set of keypoints.

19. The system of claim 18, wherein the pose of the controller comprises a position, an axis direction, and a space angle of the controller within a three-dimensional space, and wherein the pose of the headset comprises a position and two axis directions of the headset within the three-dimensional space.

20. The system of claim 19, wherein the sensor data captured by the controller comprises inertial measurement unit (IMU) data, and wherein the pose of the controller is determined based using simultaneous localization and mapping (SLAM) for self-localization.

* * * * *